(12) United States Patent
Luo

(10) Patent No.: US 10,931,804 B2
(45) Date of Patent: Feb. 23, 2021

(54) SCHEDULE PROCESSING METHOD AND ELECTRONIC TERMINAL

(71) Applicant: Huawei Technologies Co., Ltd., Shenzhen (CN)

(72) Inventor: Long Luo, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/480,895

(22) PCT Filed: Feb. 25, 2017

(86) PCT No.: PCT/CN2017/074896
§ 371 (c)(1),
(2) Date: Jul. 25, 2019

(87) PCT Pub. No.: WO2018/137268
PCT Pub. Date: Aug. 2, 2018

(65) Prior Publication Data
US 2020/0014782 A1 Jan. 9, 2020

(30) Foreign Application Priority Data

Jan. 25, 2017 (CN) .......................... 201710061386.0

(51) Int. Cl.
*H04M 1/21* (2006.01)
*G06Q 10/06* (2012.01)

(52) U.S. Cl.
CPC ........ *H04M 1/21* (2013.01); *G06Q 10/06311* (2013.01)

(58) Field of Classification Search
CPC ...................................................... H04M 1/21
See application file for complete search history.

(56) References Cited

U.S. PATENT DOCUMENTS 8,548,440 B2 * 10/2013 Lee ................... H04M 1/72566
455/414.1
2010/0099462 A1 4/2010 Baek et al.
(Continued)

FOREIGN PATENT DOCUMENTS

CN 1983315 A 6/2007
CN 103369146 A 10/2013
(Continued)

OTHER PUBLICATIONS

Machine Translation and Abstract of Chinese Publication No. CN1983315, Jun. 20, 2007, 12 pages.
(Continued)

*Primary Examiner* — Wen W Huang
(74) *Attorney, Agent, or Firm* — Conley Rose, P.C.

(57) ABSTRACT

A schedule processing method includes displaying a 24-hour interval timescale in a first display area in a user interface. The method further includes displaying, in the first display area, an identifier corresponding to each schedule on a day, where a display location of the identifier corresponding to each schedule is associated with time information of each schedule. The user interface includes the first display area and a second display area. The method further includes in response to a detected first view operation performed by a user on a first identifier, displaying, in the user interface, information about a schedule corresponding to the first identifier.

20 Claims, 17 Drawing Sheets

(56) References Cited

U.S. PATENT DOCUMENTS

| | | |
|---|---|---|
| 2010/0162170 A1 | 6/2010 | Johns et al. |
| 2011/0070924 A1 | 3/2011 | Kim |
| 2012/0066629 A1 | 3/2012 | Lee et al. |
| 2014/0059487 A1* | 2/2014 | Baumann .............. G06F 3/0482 715/811 |
| 2016/0054892 A1* | 2/2016 | Kim ....................... G04G 9/007 715/808 |
| 2016/0161922 A1* | 6/2016 | Shin ........................ G06F 1/163 368/82 |
| 2017/0004261 A1* | 1/2017 | Abou-Hawili ...... G06F 3/04817 |
| 2017/0269792 A1* | 9/2017 | Xu ........................... G06F 3/048 |
| 2017/0329477 A1* | 11/2017 | Sachidanandam ... G04G 13/026 |
| 2019/0088353 A1* | 3/2019 | Humphrys ............. G16H 10/60 |

FOREIGN PATENT DOCUMENTS

| | | |
|---|---|---|
| CN | 203595902 U | 5/2014 |
| CN | 104484796 A | 4/2015 |
| CN | 105467819 A | 4/2016 |
| CN | 106156994 A | 11/2016 |
| CN | 106331260 A | 1/2017 |
| EP | 2357594 A2 | 8/2011 |
| EP | 3236641 A1 | 10/2017 |

OTHER PUBLICATIONS

Machine Translation and Abstract of Chinese Publication No. CN103369146, Oct. 23, 2013, 18 pages.
Machine Translation and Abstract of Chinese Publication No. CN106156994, Nov. 23, 2016, 17 pages.
Machine Translation and Abstract of Chinese Publication No. CN106331260, Jan. 11, 2017, 35 pages.
Machine Translation and Abstract of Chinese Publication No. CN203595902, May 14, 2014, 7 pages.
Foreign Communication From a Counterpart Application, Chinese Application No. 201780009066.9, Chinese Office Action dated Aug. 27, 2019, 11 pages.
Foreign Communication From a Counterpart Application, PCT Application No. PCT/CN2017/074896, English Translation of International Search Report dated Sep. 28, 2017, 2 pages.
Foreign Communication From a Counterpart Application, PCT Application No. PCT/CN2017/074896, English Translation of Written Opinion dated Sep. 28, 2017, 4 pages.
Foreign Communication From a Counterpart Application, European Application No. 17894448.4, Extended European Search Report dated Oct. 28, 2019, 7 pages.

* cited by examiner

SCHEDULE PROCESSING METHOD AND ELECTRONIC TERMINAL

CROSS-REFERENCE TO RELATED APPLICATIONS

The application is a national stage application of International Application No. PCT/CN2017/074896, filed on Feb. 25, 2017, which claims priority to Chinese Patent Application No. 201710061386.0, filed on Jan. 25, 2017. Both of the aforementioned applications are hereby incorporated by reference in their entireties.

TECHNICAL FIELD

The present invention relates to the field of mobile terminal technologies, and in particular, to a schedule processing method and an electronic terminal.

BACKGROUND

A schedule management application is installed on an electronic terminal, and a user can create, edit, and view a schedule by using the schedule management application. In the prior art, an electronic terminal displays information about only one schedule in a user interface, and cannot display information about one or more other schedules except the displayed schedule on a day. When the user needs to view information about one or more other schedules on a day, the user needs to access the schedule management application to view the information. This schedule viewing method requires tedious user operations, and is inconvenient for the user to intuitively view the information about the one or more other schedules on the day, resulting in poor user experience.

SUMMARY

Embodiments of the present invention provide a schedule processing method and an electronic terminal, so as to simplify an operation of viewing a schedule by a user, and help the user intuitively view information about a plurality of schedules on a day.

A first aspect provides a schedule processing method, which is applied to an electronic terminal. The method includes:

displaying a 24-hour interval timescale in a first display area in a user interface, and displaying, in the first display area, an identifier corresponding to each schedule on a day, where a display location of the identifier corresponding to each schedule is associated with time information of each schedule, and the user interface includes the first display area and a second display area; and in response to a detected first view operation performed by a user on a first identifier, displaying, in the user interface, information about a schedule corresponding to the first identifier.

With reference to the first aspect, in some embodiments, a display location of an identifier is associated with a start time in time information of a schedule corresponding to the identifier. For example, the display location of the identifier is on a timescale of the start time, or the display location of the identifier is next to the timescale of the start time, so that the user can intuitively determine that the identifier is associated with the timescale of the start time.

With reference to the first aspect, in some embodiments, a display location of an identifier is associated with duration from a start time to an end time in time information of a schedule corresponding to the identifier. For example, the display location of the identifier is on a timescale from the start time to the end time, or the display location of the identifier is next to the timescale from the start time to end time, so that the user can intuitively determine that the identifier is associated with the timescale of the duration.

With reference to the first aspect, in some embodiments, if the first identifier is adjacent to a second identifier, for example, if a timescale for displaying the first identifier is adjacent to a timescale for displaying the second identifier, the first identifier and the second identifier are distinctively displayed.

With reference to the first aspect, in some embodiments, in response to the first view operation performed by the user on the first identifier, the information about the schedule corresponding to the first identifier is displayed in the first display area. In addition, a location in which the information about the schedule corresponding to the first identifier is displayed in the first display area is associated with the display location of the first identifier.

With reference to the first aspect, in some embodiments, when the information about the schedule corresponding to the first identifier is displayed in the first display area, information about a schedule whose start time is closest to a current system time is displayed in the second display area.

With reference to the first aspect, in some embodiments, in response to a second view operation performed by the user on the first identifier, the information about the schedule corresponding to the first identifier is displayed in the second display area. Optionally, if a second view operation performed by the user on the first identifier is not detected, information about a schedule whose start time is closest to a current system time is displayed in the second display area. If a second view operation performed by the user on the first identifier is detected, displaying, in the second display area, information about a schedule whose start time is closest to a current system time is stopped, and the information about the schedule corresponding to the first identifier is displayed in the second display area. Optionally, a display time of the information about the schedule corresponding to the first identifier may be preset by a system or set by the user.

With reference to the first aspect, in some embodiments, if the first identifier is corresponding to a plurality of schedules, information about a plurality of schedules is alternately displayed in a user interface (the first display area or the second display area). In a specific implementation, when a first operation that is in the first view operation or the second view operation and that is performed by the user on the first identifier is detected, information about one of the plurality of schedules is displayed; when a next operation that is in the first view operation or the second view operation and that is performed by the user on the first identifier is detected, information about a next schedule in the plurality of schedules is displayed by switching. Optionally, the next schedule may be determined based on a time sequence of schedules. Alternatively, when the first view operation or the second view operation performed by the user on the first identifier is detected, information about one of the plurality of schedules is displayed, and a specific identifier is set in a display area of the information about the schedule, where the specific identifier is used to determine that the first identifier is further corresponding to another schedule. In other words, the specific identifier is used to instruct the user to re-perform the first view operation or the second view operation on the first identifier to view information about a next schedule in the plurality of schedules, or instruct the user to perform the first view operation or the second view operation on the specific identifier to view information about a next schedule in the plurality of schedules.

With reference to the first aspect, in some embodiments, in response to all view operations performed by the user on all identifiers displayed in the user interface, information about schedules corresponding to all the identifiers is alternately displayed in the user interface (the first display area or the second display area). For example, when the information is alternately displayed in the first display area, a display location of information about a schedule corresponding to each identifier is associated with a display location of each identifier. For another example, when the information is alternately displayed in the second display area, information about a schedule corresponding to each identifier is displayed in a switching or rolling manner. Optionally, an identifier corresponding to a currently displayed schedule is highlighted when the information about the schedules is alternately displayed. Optionally, display duration of information about a schedule is associated with operation duration of a view operation performed on an identifier corresponding to the schedule.

With reference to the first aspect, in some embodiments, displaying of information about a schedule that carries a lock identifier is locked in the user interface.

With reference to the first aspect, in some embodiments, in response to a switching operation performed by the user on the displayed information about the schedule corresponding to the first identifier, currently displayed content (namely, the information about the schedule corresponding to the first identifier) is switched to information about a schedule corresponding to the second identifier. Optionally, the second identifier is adjacent to the first identifier, or time information corresponding to the second identifier is later than time information corresponding to the first identifier.

With reference to the first aspect, in some embodiments, that the display location of the identifier corresponding to each schedule is associated with time information of each schedule includes: if a reference time zone of each schedule is inconsistent with a current system time zone of the electronic terminal, the display location of the identifier corresponding to each schedule is associated with time information of the schedule switched to the current system time zone.

With reference to the first aspect, in some embodiments, in response to a detected time zone switching operation performed by the user on the first identifier, the display location of the first identifier is associated with time information of the schedule that is corresponding to the first identifier and that is switched to the current system time zone of the electronic terminal.

A second aspect provides a graphical user interface on an electronic. The electronic includes a touchscreen, a memory, and one or more processors configured to execute one or more programs stored in the memory, and the graphical user interface includes any interface described in the first aspect.

A third aspect provides an electronic terminal, including a touchscreen and a processor. The touchscreen is configured to display a first identifier and a second identifier in a user interface, where a display location of the first identifier is associated with time information of a schedule corresponding to the first identifier, and a display location of the second identifier is associated with time information of a schedule corresponding to the second identifier. The processor is configured to instruct, in response to a detected first view operation performed by a user on the first identifier, the touchscreen to display, in the user interface, information about a schedule corresponding to the first identifier.

It should be noted that for implementations of functions of the processor and the touchscreen, refer to the method described in the first aspect.

A fourth aspect provides an electronic terminal, including a functional unit configured to perform the method according to the first aspect.

A fifth aspect provides a readable non-volatile storage medium for storing a computer instruction, where the computer instruction is executed by an electronic terminal having a touchscreen, to implement the method described in the first aspect.

A sixth aspect provides a schedule processing method, which is applied to an electronic terminal. The method includes: obtaining time information that is of each schedule on a day and that is stored in the electronic terminal; displaying, in a user interface of the electronic terminal, an identifier corresponding to each obtained schedule, where each identifier is corresponding to at least one schedule, a display location of each identifier is associated with duration from a start time to an end time of a corresponding schedule; and in response to a detected view operation performed by a user on a first identifier, displaying, in the user interface, information about a schedule corresponding to the first identifier.

With reference to the sixth aspect, in some embodiments, the first interface includes a first display area and a second display area, and a timescale is displayed in the first display area, where each identifier is displayed on a timescale corresponding to duration from a start time to an end time of a corresponding schedule.

It should be noted that, for an implementation of the method in the sixth aspect, still refer to the method described in the first aspect.

A seventh aspect provides a schedule processing method, which is applied to an electronic terminal. The method includes: obtaining start time information that is of each schedule on a day and that is stored in the electronic terminal; displaying, in a first interface of the electronic terminal, an identifier corresponding to each obtained schedule, where each identifier is corresponding to at least one schedule, a display location of each identifier is associated with a start time of a corresponding schedule; and in response to a detected view operation performed by a user on a first identifier in the identifiers, displaying, in the first interface, information about a schedule corresponding to the first identifier. With reference to the seventh aspect, in some embodiments, the first interface includes a first display area and a second display area, and a timescale is displayed in the first display area, where each identifier is displayed on a timescale corresponding to a start time of a corresponding schedule.

It should be noted that, for an implementation of the method in the seventh aspect, still refer to the method described in the first aspect.

With reference to any one of the first to the seventh aspects, in some embodiments, the first display area is located outside the second display area.

With reference to any one of the first to the seventh aspects, in some embodiments, the method further includes: in response to a detected movement operation performed by the user on the first identifier, moving the display location of the first identifier in the first display area, and changing, based on the moved display location of the first identifier, the time information of the schedule corresponding to the first identifier.

With reference to any one of the first to the seventh aspects, in some embodiments, the method further includes: displaying, in the user interface, the changed time information of the schedule corresponding to the first identifier.

With reference to any one of the first to the seventh aspects, in some embodiments, the method further includes: in response to a detected view operation performed by the user on the first identifier, displaying, in the user interface, the changed time information of the schedule corresponding to the first identifier, where the view operation includes any one of the first view operation, the second view operation, and all the view operations.

With reference to any one of the first to the seventh aspects, in some embodiments, the method further includes: in response to a detected view operation performed by the user on a second identifier displayed in the first interface, displaying, in the user interface, information about a schedule corresponding to the second identifier, where the second identifier is different from the first identifier. The displayed information about the schedule corresponding to the second identifier may be brief information, or may be complete information. The information about the schedule may be displayed in a first area or a second area, or may be displayed in another area except the first area and the second area.

With reference to any one of the first to the seventh aspects, in some embodiments, the method further includes: in response to a movement operation performed by the user on information that is about a first schedule corresponding to the first identifier and that is displayed in the first display area, moving the information about the first schedule; generating a second identifier, where a moved display location of the information about the first schedule is associated with the second identifier, and a display location of the second identifier is determined based on the movement operation; and changing time information of the first schedule.

With reference to any one of the first to the seventh aspects, in some embodiments, the method further includes: displaying the changed time information of the first schedule in the user interface.

With reference to any one of the first to the seventh aspects, in some embodiments, the method further includes: in response to a detected view operation performed by the user on the second identifier, displaying, in the user interface, the changed time information of the first schedule corresponding to the second identifier, where the view operation includes any one of the first view operation, the second view operation, and all the view operations.

With reference to any one of the first to the seventh aspects, in some embodiments, the method further includes: editing the information about the first schedule in response to a detected edit operation performed by the user on the information that is about the first schedule and that is displayed in the user interface, and displaying edited information about the first schedule in the user interface. For example, the edit operation includes a deletion operation, a copy operation, and a pasting operation.

By implementing the embodiments of the present invention, a 24-hour interval timescale is displayed in a first display area in a user interface, and an identifier corresponding to each schedule on a day is displayed in the first display area, where a display location of the identifier corresponding to each schedule is associated with time information of each schedule, and the user interface includes the first display area and a second display area. In this way, a user can intuitively obtain a quantity of schedules on the day and times of the schedules. In response to a detected first view operation performed by a user on a first identifier, information about a schedule corresponding to the first identifier is displayed in the user interface. Therefore, the user can directly view information about a schedule in the user interface without switching a user interface or accessing a specific application, reducing interaction layers, simplifying a user operation, and increasing intelligence of human-computer interaction.

BRIEF DESCRIPTION OF DRAWINGS

To describe the technical solutions in the embodiments of the present invention more clearly, the following briefly describes the accompanying drawings required for describing the embodiments.

FIG. 1A-1 and FIG. 1A-2, FIG. 1B, FIG. 1C, and FIG. 1D-i and FIG. 1D-2 are schematic display diagrams of some user interfaces according to an embodiment of the present invention;

FIG. 4A to FIG. 4D, and FIG. 5A to FIG. 5C-1 and FIG. 5C-2 are schematic diagrams of some human-computer interaction embodiments according to an embodiment of the present invention;

DESCRIPTION OF EMBODIMENTS

Terms used in an implementation part of the present invention are merely intended to explain specific embodiments of the present invention, but are not intended to limit the present invention.

First, some user interfaces of an electronic terminal provided in this embodiment of the present invention are described. The user interface may be applied to a main screen of the electronic terminal or a specified application, and this is not limited herein.

Figures 1, 1A:
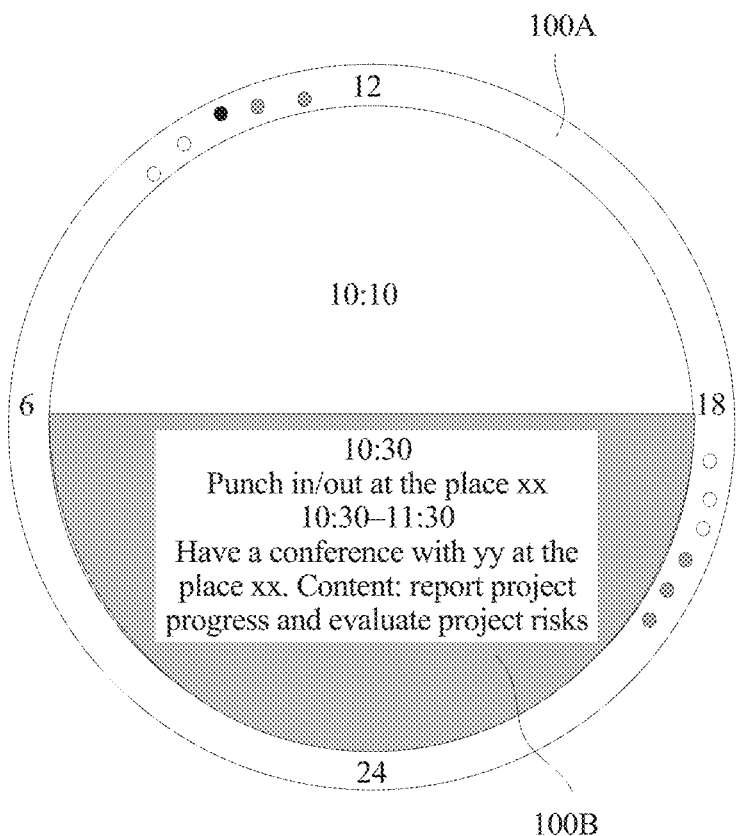
Figures 1, 1A, 2:
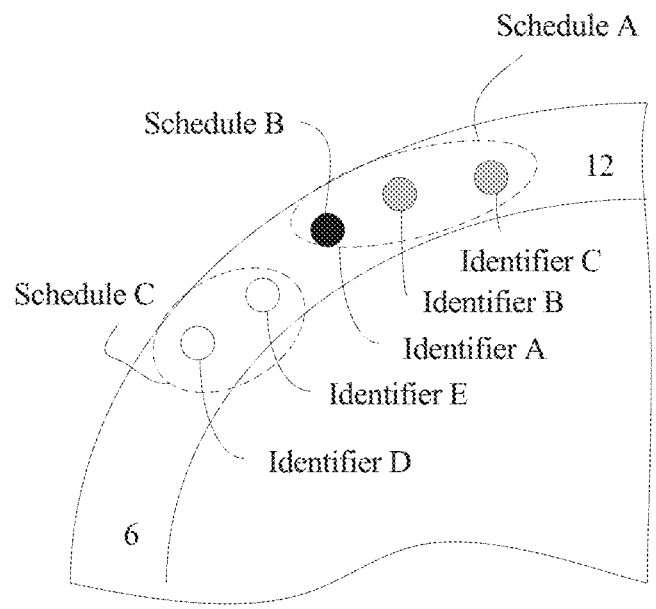
Figure 1B:
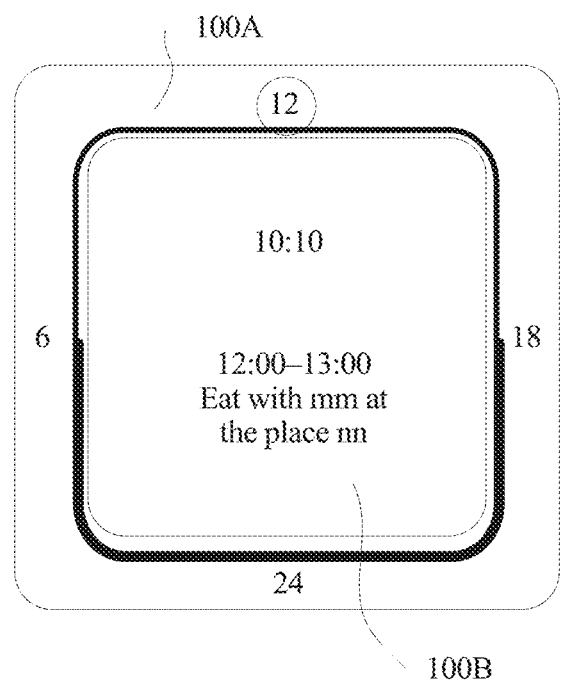
Figure 1C:
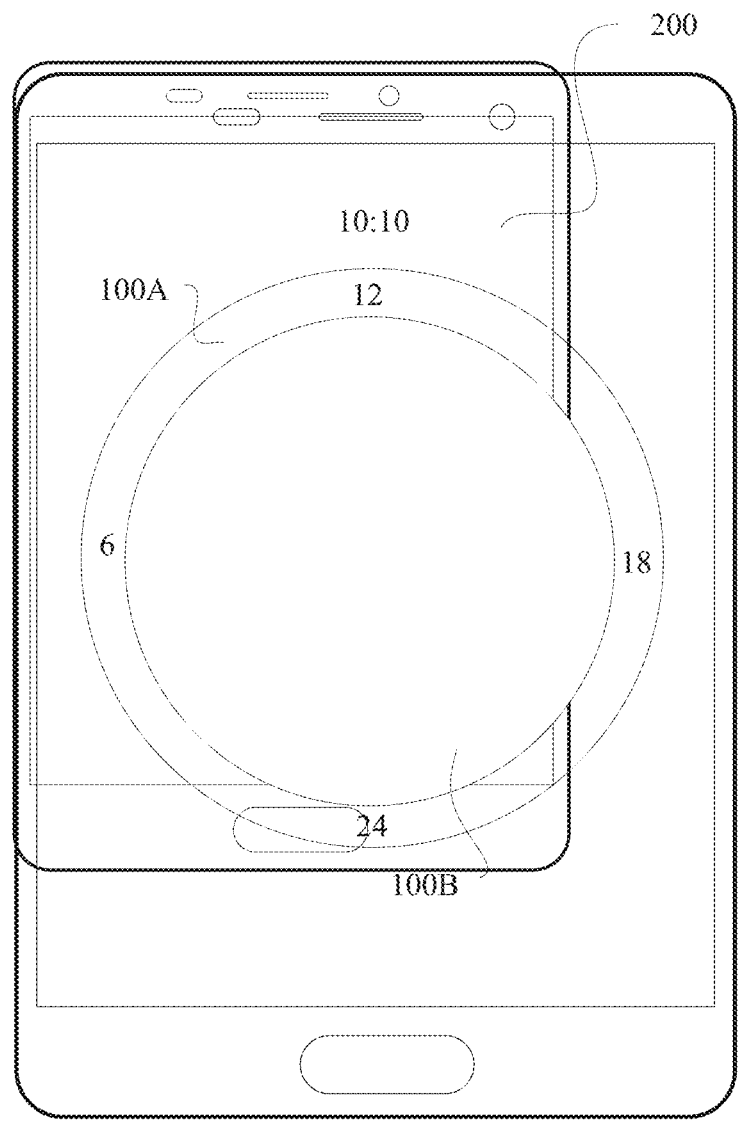

FIG. 1A-1 to FIG. 1C are schematic diagrams of some user interfaces of the electronic terminal provided in this embodiment of the present invention. As shown in FIG. 1A-1 to FIG. 1C, the user interface provided in this embodiment of the present invention may include a first display area 100A and a second display area 100B. The first display area 100A is used to display a timescale, and the second display area 100B is used to display a schedule. A watch face may alternatively be of another shape, such as a square shape or a rhombic shape, other than a circular shape shown in the accompanying drawings. Certainly, whether the user interface includes a watch face is not limited in this embodiment of the present invention.

Figures 1, 1D:
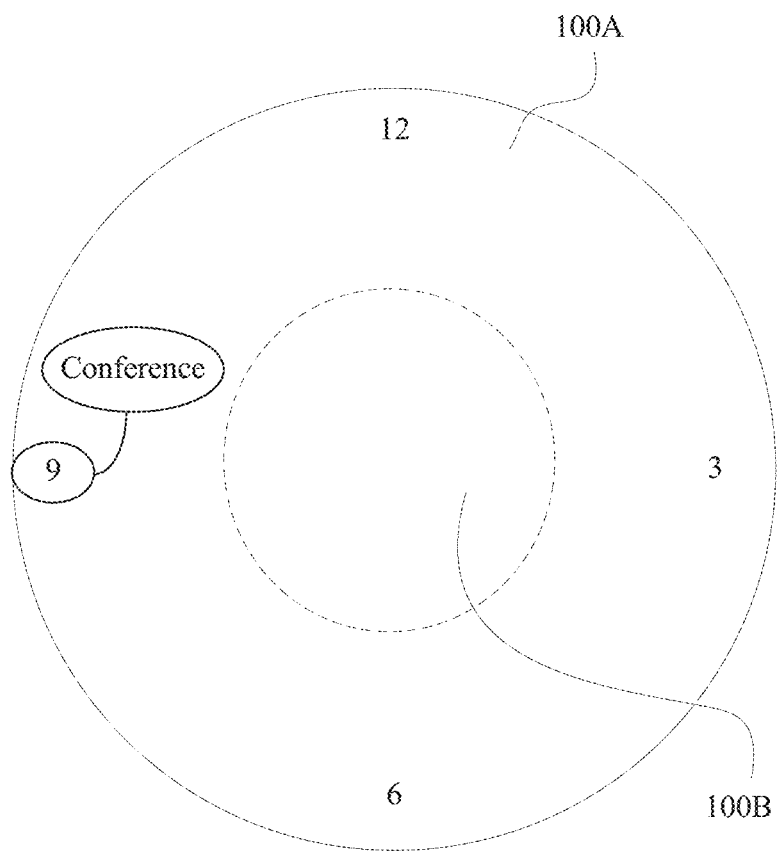
Figures 1, 1D, 2:
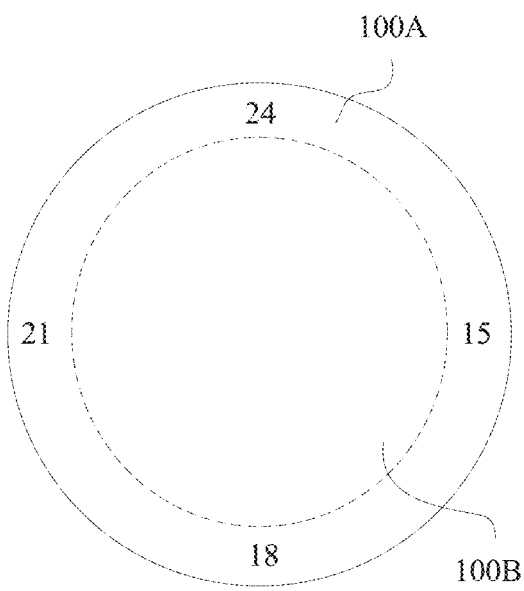

In this embodiment of the present invention, the timescale displayed in the first display area 100A is used to indicate duration, and the user can clearly determine, by viewing the timescale, duration indicated by the timescale. The duration is usually 12 hours or 24 hours. A display manner of the timescale is not specifically limited in this embodiment of the present invention. For example, in FIG. 1A-1 to FIG. 1C, the first display area 100A may be specifically a watch face 100A. The timescale in the watch face 100A is a 24-hour interval timescale. In other words, duration indicated by the timescale of the watch face is 24 hours. In FIG. 1D-1 and FIG. 1D-2, the timescale in the watch face 100A is a 12-hour interval timescale. In other words, duration indicated by the timescale of the watch face is 12 hours, where first 12 hours of one day are displayed in FIG. 1D-1, and last 12 hours of the day are displayed in FIG. 1D-2. When a time changes, the user interface can be switched from FIG. 1D-1 to FIG. 1D-2. Alternatively, the timescale in the watch face is used to indicate only 12 hours, and first 12 hours (a.m.) and last 12 hours (p.m.) in one day are distinctively displayed under control of the user or by default by the system. Alternatively, the two watch faces may be simultaneously displayed in one interface, to indicate 24 hours of one day.

When a 24-hour interval timescale is displayed on one watch face, a daytime period and a nighttime period (or an on-duty time period and an off-duty time period obtained through division, where the working time period and the rest time period may be divided into, for example, more time periods to perform more refined time management) in the first display area 100A may be distinctively indicated. In this embodiment of the present invention, a daytime period and a nighttime period that are obtained through division are used as an example for description, and details of another division manner are not described. Specifically, the daytime period may be set to 6:00-18:00, and the nighttime period may be set to 18:00-6:00. Alternatively, a daytime period and a nighttime period on a day may be calculated or obtained (for example, from weather information) based on a user instruction or a current geographical location (for example, a longitude-latitude location or an administrative location). For example, a sunrise time and a sunset time are obtained based on a current geographical location, and the daytime period and the nighttime period are then determined based on the sunrise time and the sunset time. For example, the daytime period and the nighttime period may be distinctively indicated in the following manner: As shown in FIG. 1A-1, a first part that is in the second display area 100B and that is corresponding to the timescale of the daytime period and a second part that is in the second display area 100B and that is corresponding to the timescale of the nighttime period are distinctively displayed, and to be specific, a color of the daytime period is lighter than that of the nighttime period; or as shown in FIG. 1B, a first part that is in the first display area 100A and that is corresponding to the timescale of the daytime period and a second part that is in the first display area and that is corresponding to the timescale of the nighttime period are distinctively displayed. Certainly, the daytime period and the nighttime period may be distinctively indicated in another manner, and this is not limited herein.

The first display area 100A is further used to display an identifier corresponding to a schedule. Preferably, obtained identifiers corresponding to all schedules on the day may be identified in the first display area 100A. Specifically, same as the prior art, in this embodiment of the present invention, a schedule is obtained from one or more schedule applications, or may be obtained from a specific schedule-related application (where these specific applications are applications that conform to a system interface standard and that are registered in a system, for example, a context-related smart application), or may be obtained from another device by using a wired or wireless connection. A schedule obtaining manner is not limited in the present invention. Alternatively, obtained identifiers corresponding to a plurality of (at least two) schedules on the day may be identified in the first display area 100A, for example, the first display area 100A may display the first identifier and the second identifier. For example, if a timescale is displayed in FIG. 1D-1 and FIG. 1D-2, an identifier corresponding to a schedule included in 0:00-12:00 on the day may be displayed in FIG. 1D-1, and an identifier corresponding to a schedule included in 12:00-24:00 on the day may be displayed in FIG. 1D-2.

It should be noted that the schedule described in this embodiment of the present invention represents an event that is created by the user and that is corresponding to a specific time. Information about a schedule is information that constitutes the schedule (namely, the event), including at least one of time information (including at least one of a start time, an end time, and duration), title information, content information (including at least one of detailed content description, general content description, a content keyword, and a participant), schedule source information, a lock identifier, and the like. All or some information of a schedule may be obtained when the schedule is obtained. Further, all or some information of the schedule may be displayed.

A correspondence between an identifier displayed in the first display area 100A and a schedule may be as follows: One identifier is corresponding to one schedule; one identifier is corresponding to a plurality of schedules, for example, time information of the plurality of schedules overlaps; or a plurality of identifiers are corresponding to one schedule. A display location of an identifier is associated with a display location of time information of a corresponding schedule. Specifically, the display location of the identifier may be associated with a timescale of a start time of the corresponding schedule, or the display location of the identifier may be associated with a timescale in duration from the start time to an end time of the corresponding schedule. For example, as shown in FIG. 1A-1, the display location of the identifier is on a timescale of a watch face. FIG. 1A-1 draws only a timescale having an identifier. An interval between adjacent timescales is half an hour, and another timescale having no schedule identifier is not displayed. Certainly, the display location of the identifier may alternatively be next to the timescale, provided that an association manner enables the user to determine the start time corresponding to the identifier or duration from the start time to the end time corresponding to the identifier. A specific manner is not limited herein. FIG. 1A-1 illustrates an identifier display manner used as an example, and an identifier display manner is not limited in this embodiment of the present invention.

For example, for a correspondence between an identifier and a schedule, refer to FIG. 1A-2. FIG. 1A-2 is a schematic diagram of partial displaying of FIG. 1A-1. Identifiers A to C currently displayed on the watch face 100A are corresponding to a schedule A. Time information of the schedule A is 10:30-11:30, content information of the schedule A is "Have a conference with xx at the place xx, and content of the conference includes project progress discussion and risk evaluation". The identifier A is corresponding to a schedule B, time information of the schedule B is 10:30, and content information is "Punch in/out at the place xx". Identifiers D and E are corresponding to a schedule C. Time information of the schedule C is 9:00-10:00, and content information of the schedule C is "Training at the place xx". That the identifiers D and E are corresponding to the schedule C is an example in which a plurality of identifiers are corresponding to one schedule. That the identifier A is corresponding to the schedule B is an example in which one identifier is corresponding to one schedule. That the identifier A is corresponding to both the schedule A and the schedule B is an example in which one identifier is corresponding to a plurality of schedules. Display locations of the identifiers shown in FIG. 1A-2 are on a timescale from a start time of the schedule to an end time of the schedule. A display location of an identifier corresponding to the schedule A is adjacent to a display location of an identifier corresponding to the schedule C, so that identifiers corresponding to the two schedules may be distinctively displayed. For an example distinctive display manner, refer to FIG. 1A-2. The identifier A is corresponding to two schedules, so that the identifier A and another identifier may be further distinctively displayed by using, for example, different shapes, sizes, colors, or brightness. For an example distinctive display manner, refer to FIG. 1A-2. A distinctive display manner may be differentiating display formats, display modes, display effects, and the like of identifiers. This is not specifically limited in this embodiment of the present invention. In addition, the display location of the identifier may be associated with the start time of the schedule. As shown in FIG. 1B, the identifier is displayed on a timescale of 12:00, indicating that a schedule starts at 12:00. A schedule identifier display manner in FIG. 1A-1 helps a user more intuitively understand time information of the schedule, for example, a start time, an end time, and duration.

The second display area 100B is used to display information about a schedule. In this case, the second display area 100B is used to display all or some of the information about the schedule. The schedule displayed in the second display area 100B may be a schedule whose start time is closest to a current system time, or the schedule displayed in the second display area 100B is a schedule that is displayed after a view operation of the user is detected and that is corresponding to the view operation. The second display area 100B may further display other information such as a current system time, a current system date, a current ambient temperature, an alarm clock, a new notification, and the like.

For example, as shown in FIG. 1A-1, a current system time displayed in the second display area 100B is 10:10, and schedules whose start time is closest to the current system time is a schedule B and a schedule A, so that information about the schedule B and information about the schedule A may be simultaneously displayed in the second display area, or information about the schedule A and information about the schedule B are alternately displayed in the second display area. An alternate display manner is rolling display, switching display, or the like. This is not limited in this embodiment of the present invention. As shown in FIG. 1B, a current system time displayed in the second display area 100B is 10:10, and an identifier corresponding to a schedule whose start time is closest to the current system time is displayed at 12:00, so that a schedule D is displayed in the second display area 100B in FIG. 1B. Time information of the schedule D is 12:00-13:00, and content information of the schedule D is "Eating with mm at the place nn".

In this embodiment of the present invention, both the second display area 100B and the first display area 100A may be used to display the information about the schedule. For example, as shown in FIG. 1D-l, the first display area 100A displays an identifier and information about a corresponding schedule. The information about the schedule is "Conference", and a display location of the information about the schedule may be associated with the identifier. The display manner in FIG. 1D-I can intuitively provide a prompt of a conference started at 9:00 for the user. Further, as shown in FIG. 1A-1, the user may perform a view operation on the information about the schedule. For example, when a view operation performed by the user on the identifier or the information about the schedule is detected, detailed information may be further displayed in the second display area. Alternatively, the detailed information may be displayed in the first display area.

It should be noted that, in response to a first view operation performed by the user on the first identifier, first information of a schedule corresponding to the first identifier may be displayed in the first display area 100A; and in response to a second view operation performed by the user on the first identifier, second information of the schedule corresponding to the first identifier may be displayed in the second display area 100B. The first information may be the same as or different from the second information.

Certainly, in some possible implementations, the display location of the identifier is not limited to the first display area, and the display location of the information about the schedule is not limited to the second display area.

In some possible implementations, the displayed information about the schedule may be determined based on a size of a display area of the information about the schedule, a display area location of the information about the schedule, a view operation performed on the schedule, or the like. For example, if the display area of the information about the schedule is small, general information of the schedule is displayed; or if the display area of the schedule is large, detailed information of the schedule is displayed. For another example, if the display area of the information about the schedule is associated with the identifier, key information of the schedule is displayed; or if the display area of the information about the schedule is not associated with the identifier, detailed information of the schedule is displayed. For another example, if a user operation for viewing the schedule is the first view operation, detailed information of the schedule is displayed; or if a user operation for viewing the schedule is the second view operation, general information of the schedule is displayed.

In some possible implementations, an unfinished schedule, a finished schedule, and an ongoing schedule in a schedule may be distinctively displayed by distinctively displaying identifiers corresponding to the schedule. A manner of distinctively displaying the identifiers may include distinctively displaying at least one of display formats, display modes, display effects, and the like of the identifiers, including but are not limited to different shapes, sizes, colors, brightness, animation, and the like.

In the foregoing user interface display manner, a schedule is closely associated with a time on a day, so that the user can directly view, without switching a user interface or accessing a specific application, a quantity of schedules on the day and a schedule time corresponding to each schedule, reducing user operations and improving human-computer interaction efficiency. Therefore, user experience is relatively good.

The following describes some embodiments of human-computer interaction according to an embodiment of the present invention.

For a schematic diagram of displaying when the user interface detects the first view operation of the user, refer to FIG. 1D-1. As shown in FIG. 1D-1, in response to a first view operation performed by the user on an identifier at a display location at 9:00, information about a schedule corresponding to the identifier may be displayed at a display location associated with the display location of the identifier in the first display area 100A. As shown in FIG. 1D-i, the information about the schedule corresponding to the identifier at 9:00 is "Conference". The "Conference" herein may only be some of the information about the schedule. Further, if a second view operation performed by the user on the identifier is detected, all of the information about the schedule may be displayed in the second display area 100B.

Further, in response to all detected view operations performed by the user on all identifiers displayed in the first display area 100A, information about a schedule corresponding to each identifier may be alternately displayed in the first display area, and a display location of the information about the schedule corresponding to each identifier is associated with a display location of each identifier. Further, if the identifier in the first display area is corresponding to a plurality of schedules, information about the plurality of schedules is alternately displayed in the first display area in response to the detected first view operation performed by the user on the identifier. Display locations of the information about the plurality of schedules may be the same or different. This is not limited herein.

Figure 2A:
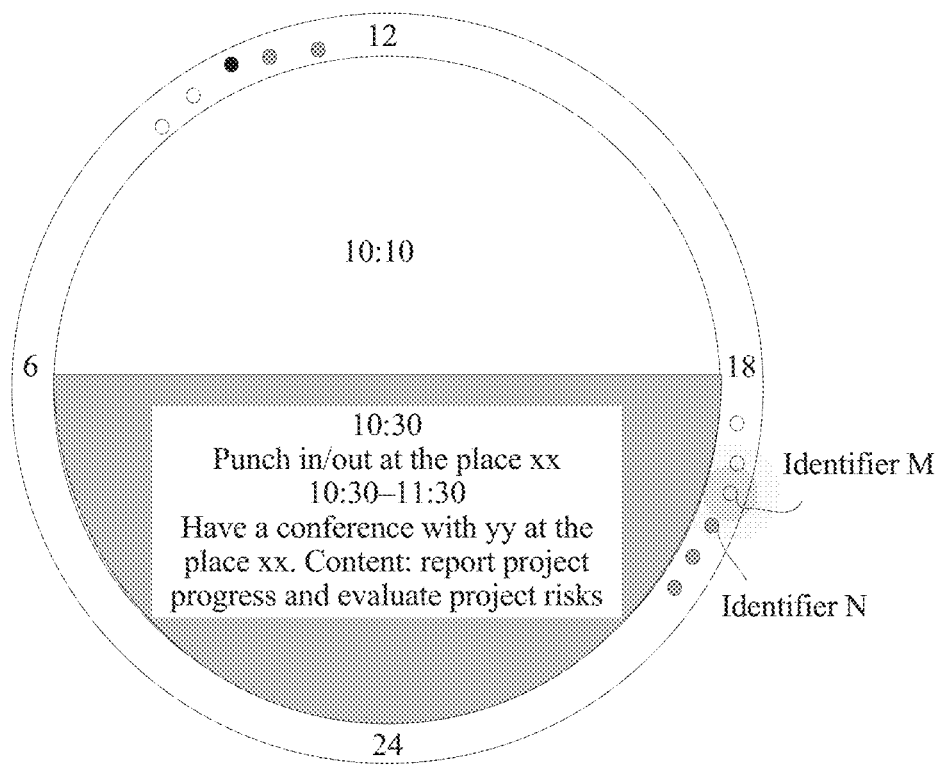
FIG. 2A and FIG. 2B, FIG. 3A to FIG. 3C.
Figure 2B:
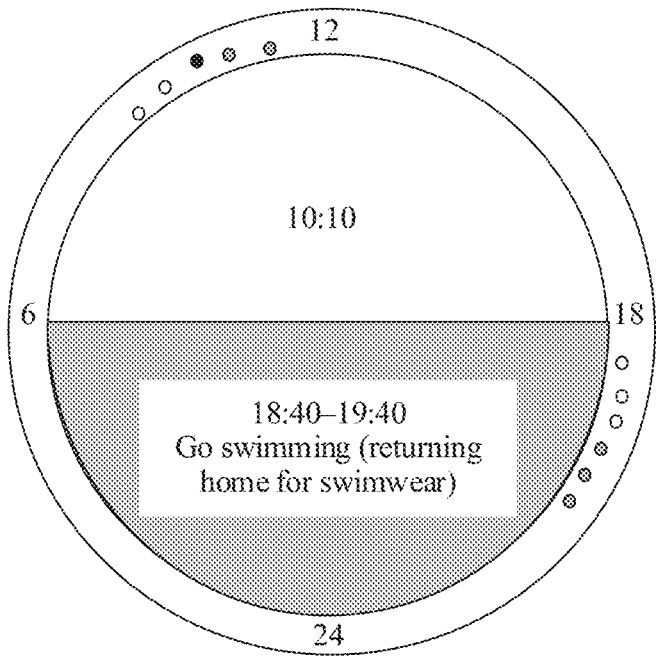

FIG. 2A and FIG. 2B show a schematic diagram of a change of a user interface when a second view operation of a user is detected.

As shown in FIG. 2A, the user interface displays, in the second display area, information about a schedule whose start time is closest to a current system time. In some possible embodiments, the user interface may not display information about a schedule whose start time is closest to a current system time, and the user interface may display an upcoming schedule at a specified time to provide a prompt for the user, for example, information about the schedule is displayed 15 minutes earlier than a start time of the schedule. Alternatively, the user interface may not display information about a schedule whose start time is closest to a current system time, but display information about a full day schedule. For example, when the user sets birthday celebration as a full day schedule, the full day schedule is displayed in the second display area. Generally, for an expired schedule, if a current time is 10:10 a.m., information about a 9:00-10:00 schedule is not displayed in the second display area. However, if the schedule is the only schedule on a day, the only schedule can be displayed in the second display area regardless of whether the schedule has expired.

When the second view operation performed by the user on the first identifier is detected, in response to the second view operation, the information about the schedule corresponding to the first identifier may be displayed. For example, as shown in FIG. 2A, when a first view operation performed by the user on an identifier M is detected, information about a schedule corresponding to the identifier M may be displayed in the second display area of the user interface. For example, time information of a schedule M corresponding to the identifier M is 18:40-19:40, and content information is "Go swimming (returning home for swimwear)", and information about the schedule M may be displayed in the second display area of the user interface. If information about a schedule (for example, information about a schedule whose start time is closest to a current system time) was displayed in the second display area, the previously displayed information about the schedule may be replaced by the information about the schedule M. In other words, displaying of the previously displayed information about the schedule is stopped, and the information about the schedule M is displayed. Alternatively, if displaying of information about a schedule that carries a schedule identifier is locked in the second display area, the information about the schedule M and the displayed and locked information about the schedule may be separately displayed in separate areas in the second display area. Alternatively, a display layer of the schedule M is placed above a display layer of the displayed and locked information about the schedule in the second display area.

Further, a display time of the second display area may further be set. Optionally, the display time may be associated with operation duration of the second view operation. For example, the information about the schedule corresponding to the first identifier is displayed when the user touches and holds the first identifier, and previous displaying is restored when the user releases a finger; or the information is displayed for 5 seconds when the user performs touching, and the information is displayed for 10 seconds when the user performs touching and holding.

In some possible implementations, when the detected second view operation is corresponding to a plurality of identifiers, for example, an operation coordinate range of the second view operation covers a plurality of identifiers, and the plurality of identifiers are corresponding to different schedules, schedules represented by the plurality of schedule identifiers corresponding to the first view operation may be simultaneously or alternately displayed in the second display area. For example, as shown in FIG. 2A, when the identifiers corresponding to the detected second view operation include an identifier M and an identifier N, information about a schedule M corresponding to the identifier M and information about a schedule N corresponding to the identifier N are simultaneously or alternately displayed in the second display area. In a specific implementation, a display order of alternately displaying information about a plurality of schedules may be determined based on distances between identifiers corresponding to the plurality of schedules and an operation coordinate center point of the second view operation, or the display order is determined based on a time sequence of schedule start times of the plurality of schedules. For example, information about a schedule corresponding to an identifier that is closest to the operation coordinate center point of the second view operation is preferentially displayed, or information about a schedule with an earliest start time is preferentially displayed. In a specific implementation, alternating frequency for alternatively displaying the plurality of schedules is determined based on operation frequency for performing the second view operation on the identifiers. Alternatively, when the detected second view operation is corresponding to a plurality of identifiers, information (such as time information) about a plurality of schedules corresponding to the plurality of identifiers is further notified to the user in an option manner, so that the user may select and display information about at least one schedule.

In some possible implementations, when one identifier corresponding to the detected second view operation is corresponding to a plurality of schedules, information about the plurality of schedules may be simultaneously or alternately displayed in the second display area. If the information about the plurality of schedules is alternately displayed, the display order of the plurality of schedules may be determined based on priorities of the schedules or a system default order (for example, a time sequence, where information about a schedule with an earliest start time in the schedules is first displayed), and the priorities of the schedules may be set by the user. Alternatively, a symbol is set at the end of the displayed information about the schedule. The symbol is used to notify the user of undisplayed information about a schedule corresponding to the identifier, and information about a next schedule corresponding to the identifier is displayed by using a second view operation re-entered by the user.

In some possible implementations, the second view operation may be a touch operation performed on an identifier, for example, single tapping, double tapping, touching and holding, or sliding; or the second view operation may be a gesture operation performed on an identifier, for example, a floating gesture operation. Alternatively, the second view operation may be an operation that can be recognized by any electronic terminal, for example, a voice operation, a pressure operation, or an infrared remote control operation.

With reference to FIG. 2A and FIG. 2B, FIG. 3A to FIG. 3C show a schematic diagram of another change in a user interface when a first view operation of a user is detected. In this embodiment, in response to a detected first view operation performed by a user on an identifier, information about a schedule corresponding to the identifier is displayed in the second display area. Details about a difference between a response to a detected second view operation performed by the user in this embodiment and that described in FIG. 2A and FIG. 2B are described below.

The second view operation is different from the first view operation. For example, an operation type of the second view operation may be different from that of the first view operation, or operation pressure or operation duration of the second view operation is different from that of the first view operation. For example, the first view operation is a single tap operation, and the second view operation is a touch and hold operation; or the first view operation is a single tap operation, and the second view operation is a multi-tap operation.

Figure 3A:
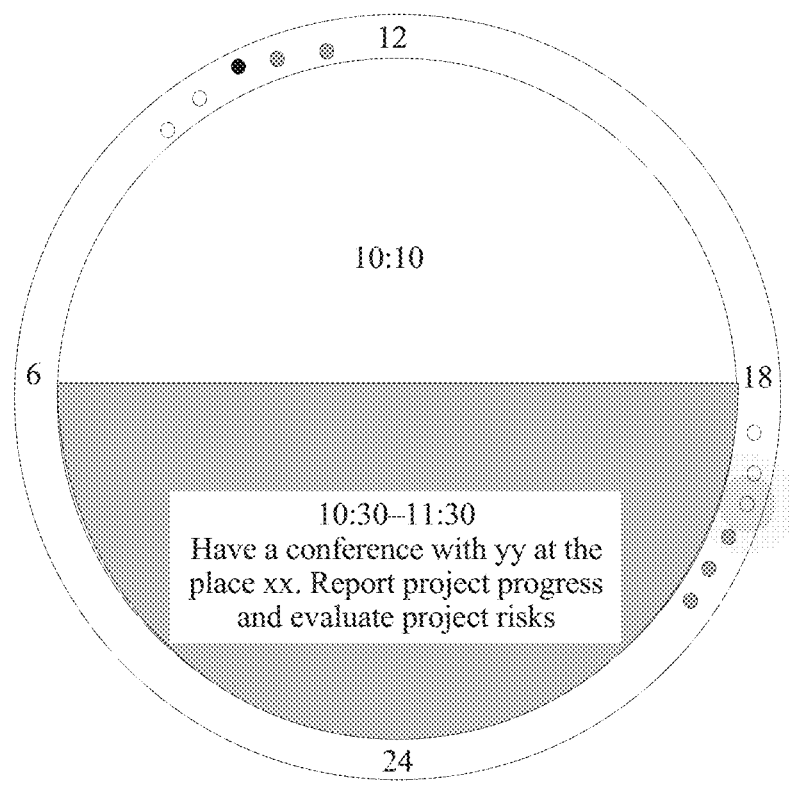
Figure 3B:
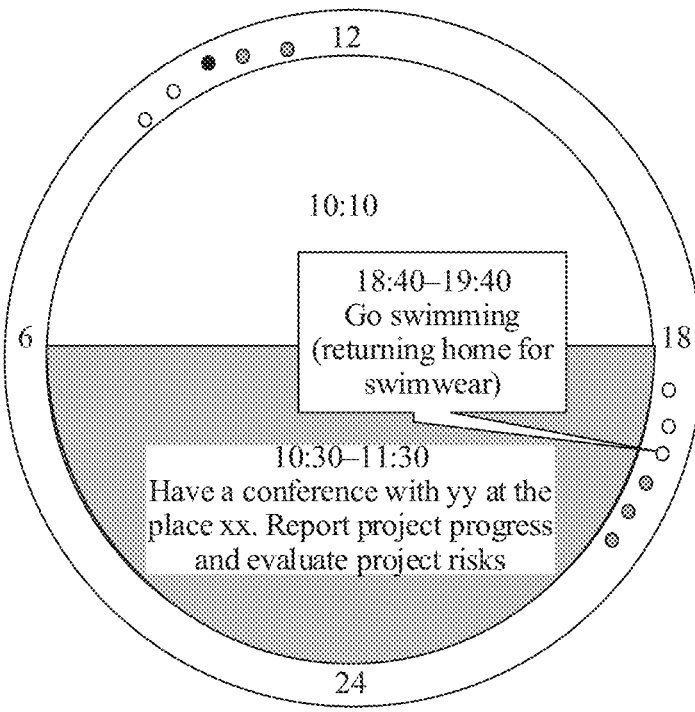
Figure 3C:
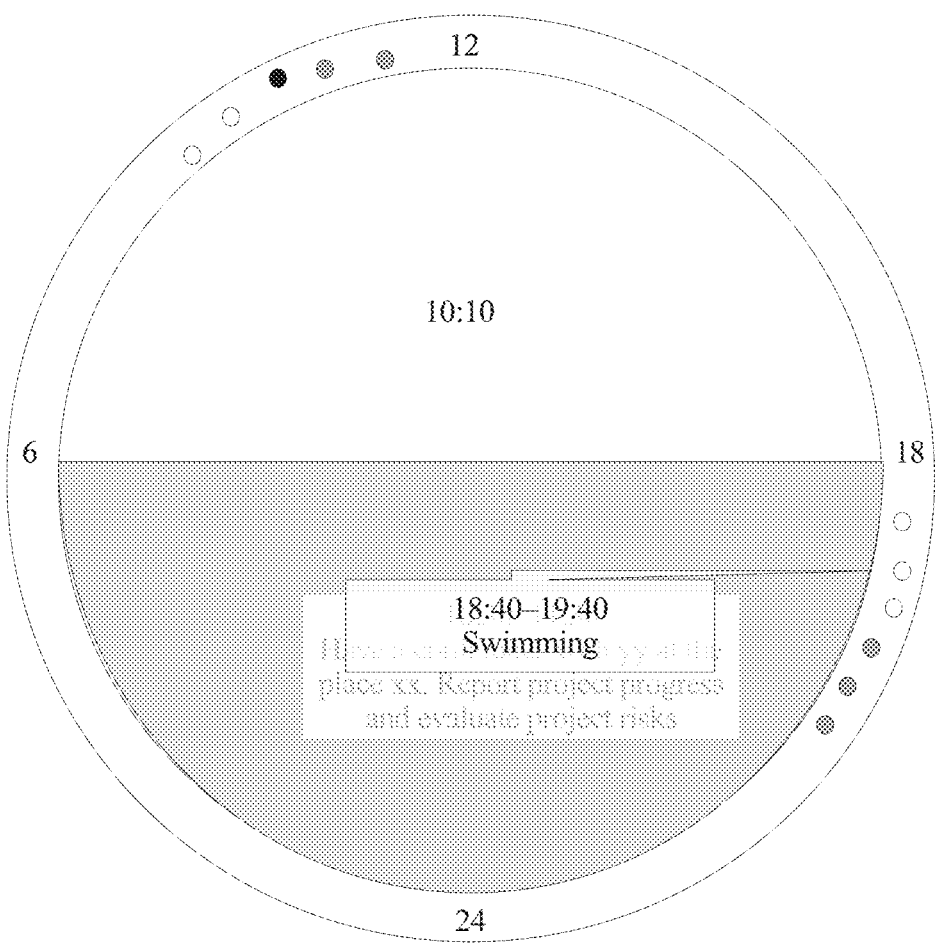

After the first view operation is detected, information about a schedule corresponding to the first view operation may be displayed at a display location corresponding to the first view operation. The display location corresponding to the first view operation is different from the display location corresponding to the second view operation. The display location described herein includes a display area, a display layer, and the like. For example, in this embodiment of the present invention, the display location corresponding to the first view operation may be explained with reference to FIG. 3B and FIG. 3C. When the first view operation is detected, in response to the first view operation, information about a schedule may be displayed at the display location corresponding to the first view operation. For example, as shown in FIG. 3A, the information about the schedule corresponding to the second view operation is currently displayed in the second display area 100B. As shown in FIG. 3B, when the first view operation is detected, the information about the schedule corresponding to the first view operation is displayed in a first display subarea of the second display area, and the information about the schedule corresponding to the second view operation is currently displayed in a second display subarea of the second display area. In other words, a display area corresponding to the first view operation is different from a display area corresponding to the second view operation. For another example, as shown in FIG. 3C, the information about the schedule corresponding to the first view operation is displayed on a first layer, and information about the schedule corresponding to the second view operation is displayed on a second layer, where the first layer covers the second layer. Optionally, as shown in FIG. 3B or FIG. 3C, the display location corresponding to the first view operation may be associated with a display location of an identifier. Optionally, display duration of the schedule corresponding to the first view operation may be specified duration, or may be associated with operation duration of the second view operation. For example, the information about the schedule corresponding to the first identifier is displayed when the user touches and holds the first identifier, and previous displaying is restored when the user releases a finger; or the information is displayed for 5 seconds when the user performs touching, and the information is displayed for 10 seconds when the user performs touching and holding.

FIG. 4A to FIG. 4D show a schematic diagram of a display change of a second display area after the user interface detects a switching operation performed by the user on information about a schedule displayed in the second display area.

Figure 4A:
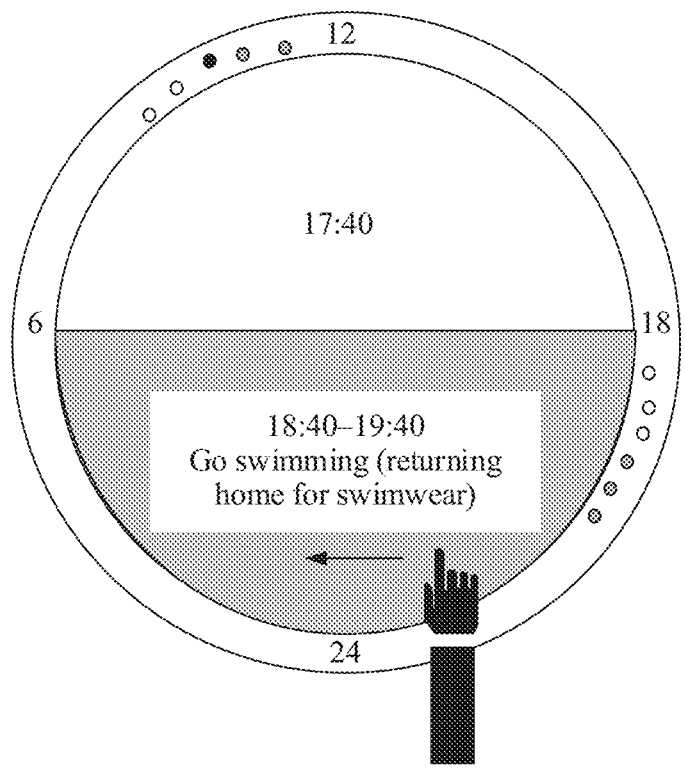
Figure 4B:
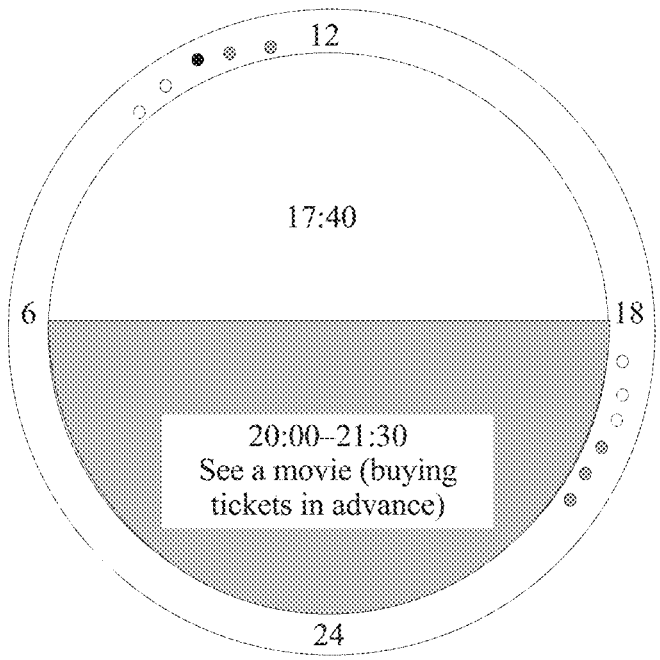

As shown in FIG. 4A and FIG. 4B, a slide operation is used as an example of the switching operation in FIG. 4A to explain the display change of the second display area. An operation type of the switching operation constitutes no limitation on this embodiment of the present invention. The switching operation may further include another touch operation such as a touch pressure operation, or a gesture operation such as a floating gesture. After the switching operation is detected, a schedule displayed in the second display area may be switched. That the switching operation is detected in the second display area is used as an example in this embodiment of the present invention. Certainly, the switching operation may also be detected in another display area or by using other configuration of the electronic terminal. Specifically, a schedule to be switched may be determined based on an operation direction of an operation. For example, as shown in FIG. 4A, if an operation direction of a switching operation is downward or leftward, it is determined that the to-be-switched schedule is a next schedule, and a time of the next schedule is later than a schedule time of a currently displayed schedule; or if an operation direction of a switching operation is upward or rightward, it is determined that the to-be-switched schedule is a previous schedule, and a schedule time of the previous schedule is earlier than a schedule time of a currently displayed schedule. Further, the to-be-switched schedule may be determined with reference to a track length of an operation track. For example, if the track length of the operation track is in a first range, it is determined that a schedule adjacent to the currently displayed schedule is the to-be-switched schedule; or if the track length of the operation track is in a second range, it is determined that a schedule with an interval of N schedules from the currently displayed schedule is the to-be-switched schedule, and N is a positive integer.

For example, information about a schedule whose start time is closest to a current system time is displayed in the second display area in FIG. 4A, a schedule time is 18:40-19:40, and content information is "Go swimming (returning home for swimwear)". When a switching operation is detected, in response to the switching operation, the information about the schedule displayed in the second display area is switched to schedule information of a next schedule of the currently displayed schedule. As shown in FIG. 4B, the schedule time of the next schedule is 20:00-21:30, and content information is "See a movie (buying tickets in advance)".

Detecting a switching operation of the user is not limited in the second display area. When the information about the schedule is displayed in the first display area, a switching operation performed by the user on the information about the schedule may be detected in the first display area.

Figure 4C:
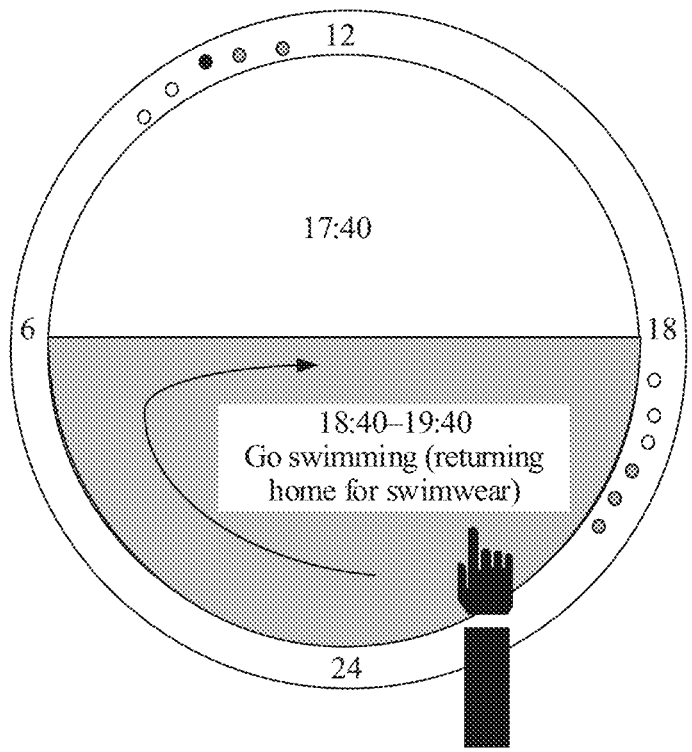
Figure 4D:
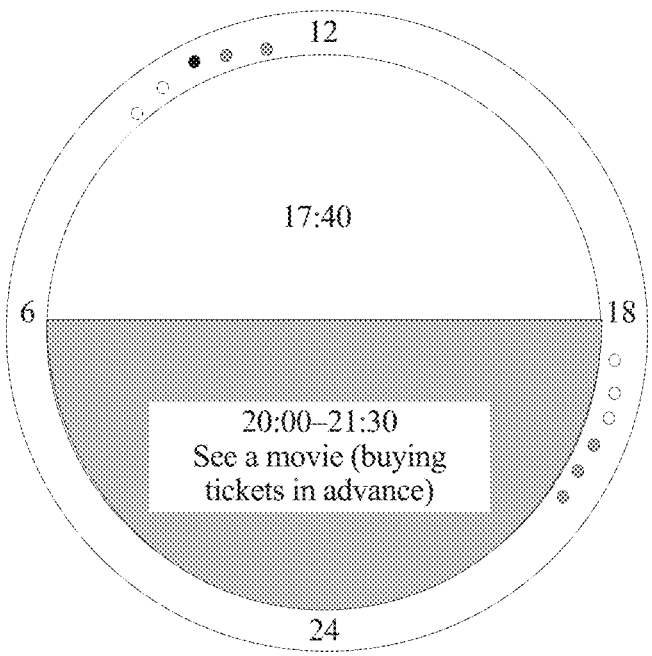

FIG. 4C and FIG. 4D show a case of alternately displaying information that is about a schedule corresponding to each of all identifiers and that is currently displayed in the first display area, or FIG. 4C and FIG. 4D may be used to indicate information about schedules corresponding to all identifiers on a day. That all view operations are detected in the second display area is used as an example in this embodiment of the present invention. Certainly, all the view operations may also be detected in another display area or by using other configuration of the electronic terminal. For example, a floating gesture operation above a display screen of the electronic terminal is detected, and if the detected floating gesture is encircling a watch face one round, the information about the schedule corresponding to each of all the identifiers is alternately displayed in the second display area. When all the view operations (or a third view operation) are detected, in response to all the view operations, information about schedules corresponding to all the identifiers is alternately displayed in the second display area. All the view operations shown in FIG. 4C are clockwise slide operations, and this operation manner is merely used to explain this embodiment of the present invention, and constitutes no limitation on this embodiment of the present invention. In response to the detected clockwise slide operations, the information about the schedule corresponding to each of all the identifiers in the watch face may be sequentially displayed. For example, a display order is a clockwise order of schedule times. Likewise, if a counterclockwise slide operation is detected, the information about the schedule corresponding to each of all the identifiers in the watch face may be displayed in a counterclockwise sequence. Further, display duration of each schedule may be determined based on an operation speed or operation duration, or each schedule is displayed based on specified duration.

In some possible implementations, a display manner of an identifier corresponding to the currently displayed schedule may change in a process of alternately displaying the information about the schedule corresponding to each of all the identifiers. For example, an identifier corresponding to a currently displayed schedule is highlighted or flashing, and further, an identifier corresponding to a displayed schedule, an identifier corresponding to a currently displayed schedule, and an identifier corresponding to an undisplayed schedule may be distinctively displayed. For example, the identifier corresponding to the currently displayed schedule has a convex display effect, the identifier corresponding to the displayed schedule has a concave display effect, and the identifier corresponding to the undisplayed schedule has a plane display effect.

FIG. 5A to FIG. 5C-1 and FIG. 5C-2 show some embodiments of obtaining a schedule by an electronic terminal (an intelligent wearable device such as a smartwatch).

Figure 5A:
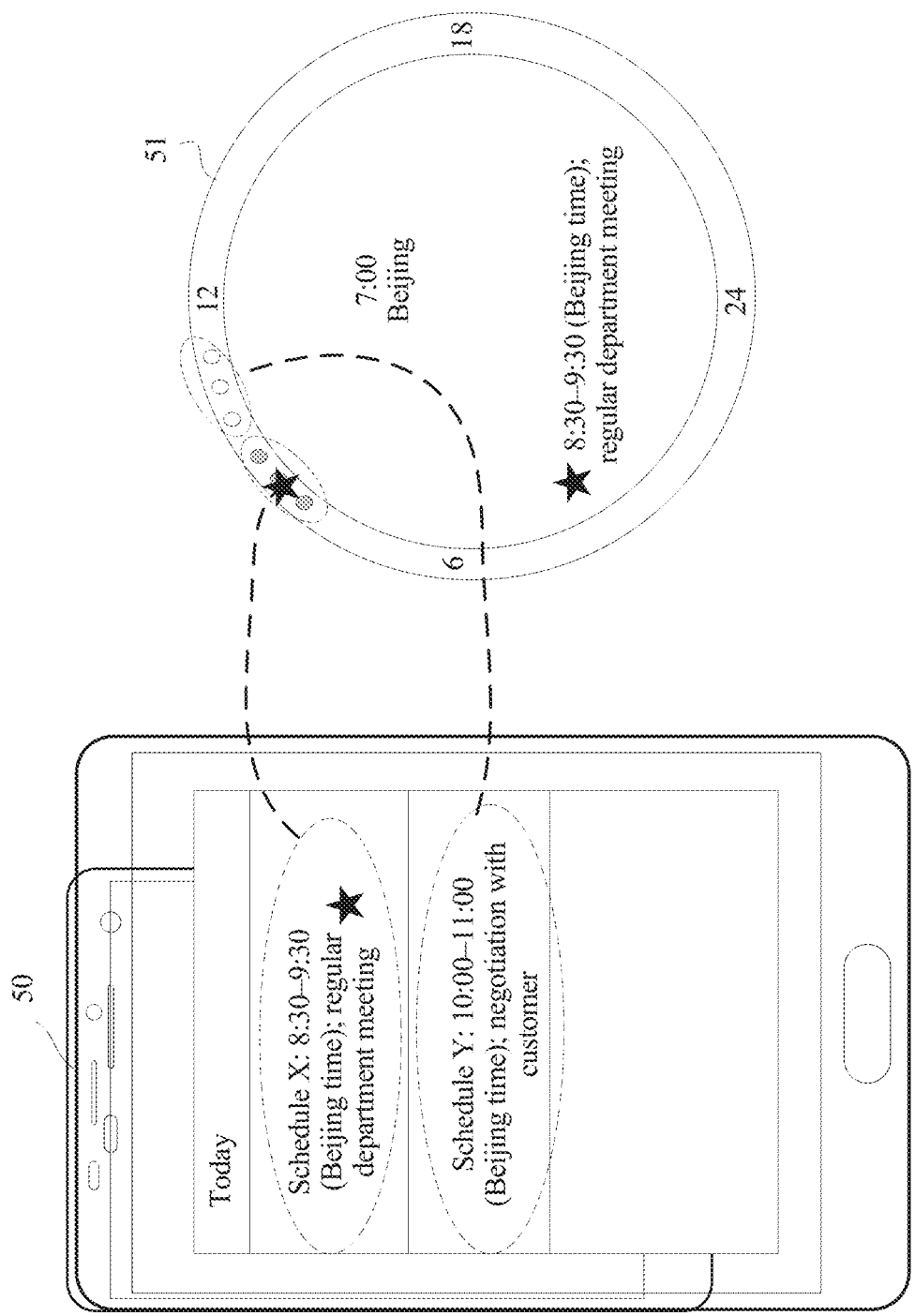

As shown in FIG. 5A to FIG. 5C-1 and FIG. 5C-2, a wireless communication connection may exist between a smartphone 50 and a smartwatch 51, for example, a Bluetooth connection, to implement data communication between the smartphone 50 and the smartwatch 51. The user may formulate a schedule in the smartphone 50. For example, the schedule is formulated by using a schedule management application in the smartphone 50, and a schedule corresponding to a date may be displayed in an application interface of the smartphone 50. As shown in FIG. 5A, information about the schedule in the smartphone 50 is displayed in a list. The electronic terminal 51 may receive a schedule in the smartphone 50, and to be specific, may receive some or all of information about the schedule, and may display, based on time information on a timescale corresponding to the time information, an identifier corresponding to the obtained schedule. Identifiers corresponding to a schedule X and a schedule Y that are adjacent to each other are distinctively displayed as an example in FIG. 5A.

It should be noted that schedule information received by the electronic terminal 51 and schedule information displayed on the smartwatch are not necessarily the same. For example, the displayed schedule information is only a part of the received schedule information. For example, the received schedule information includes information such as time information (including at least one of a start time, an end time, and duration), title information, content information (including detailed content description, general content description, a content keyword, a participant, and the like), schedule source information, and a lock identifier. The displayed schedule information includes only time information and general content information. If only a part of the schedule information is displayed, a view operation performed by the user on all information about the schedule may be detected, and in response to the view operation, all information about a schedule corresponding to the view operation may be displayed in the user interface or in another interface (for example, a schedule management application interface).

In some possible implementations, the electronic terminal 51 locks displaying of information about a schedule based on a lock identifier in the received schedule information. It should be noted herein that the lock identifier may include a lock icon (such as a lock switch) that is set in the schedule information, or may be a lock keyword that can be determined as a lock identifier. For example, the lock keyword may include keywords such as "full-day display", "important", "lock", and "special prompt". For example, as shown in FIG. 5A, a lock identifier included in a schedule X is a star-shaped icon, and displaying of information about the schedule X may be locked on a watch face of the electronic terminal 51 based on a specified time (for example, the specified time is 12 hours, 24 hours, or a schedule time of the schedule X). Optionally, when an operation (for example, a first view operation or a second view operation) performed by the user on an identifier corresponding to another schedule is detected in duration in which displaying of the information about the schedule X is locked, information about the another schedule may be displayed outside a locked display area. Alternatively, the information about the another schedule is displayed, within a specified time (for example, 1s) or an operation time of the view operation, on a layer covering the locked display area. Optionally, the electronic terminal 51 may further display a lock identifier (for example, a lock icon) in the schedule information in a display area of an identifier corresponding to a locked schedule, or display a lock identifier of a schedule as information about the schedule with other information of the schedule. For a lock identifier display manner, refer to FIG. 5A.

In some possible implementations, after a schedule is obtained and an identifier corresponding to information about the schedule is displayed in the first display area, a lock operation performed by the user on the schedule is detected, for example, a lock operation performed by the user on information about a schedule displayed in the second display area. After the lock operation performed by the user on the information about the schedule is detected, the schedule is locked and displayed on the watch face in response to the lock operation.

For information about a schedule that carries a lock identifier, displaying of the information about the schedule may be locked in the first display area, or displaying of the information about the schedule may be locked in the second display area. This is not limited in this embodiment of the present invention.

Figure 5B:
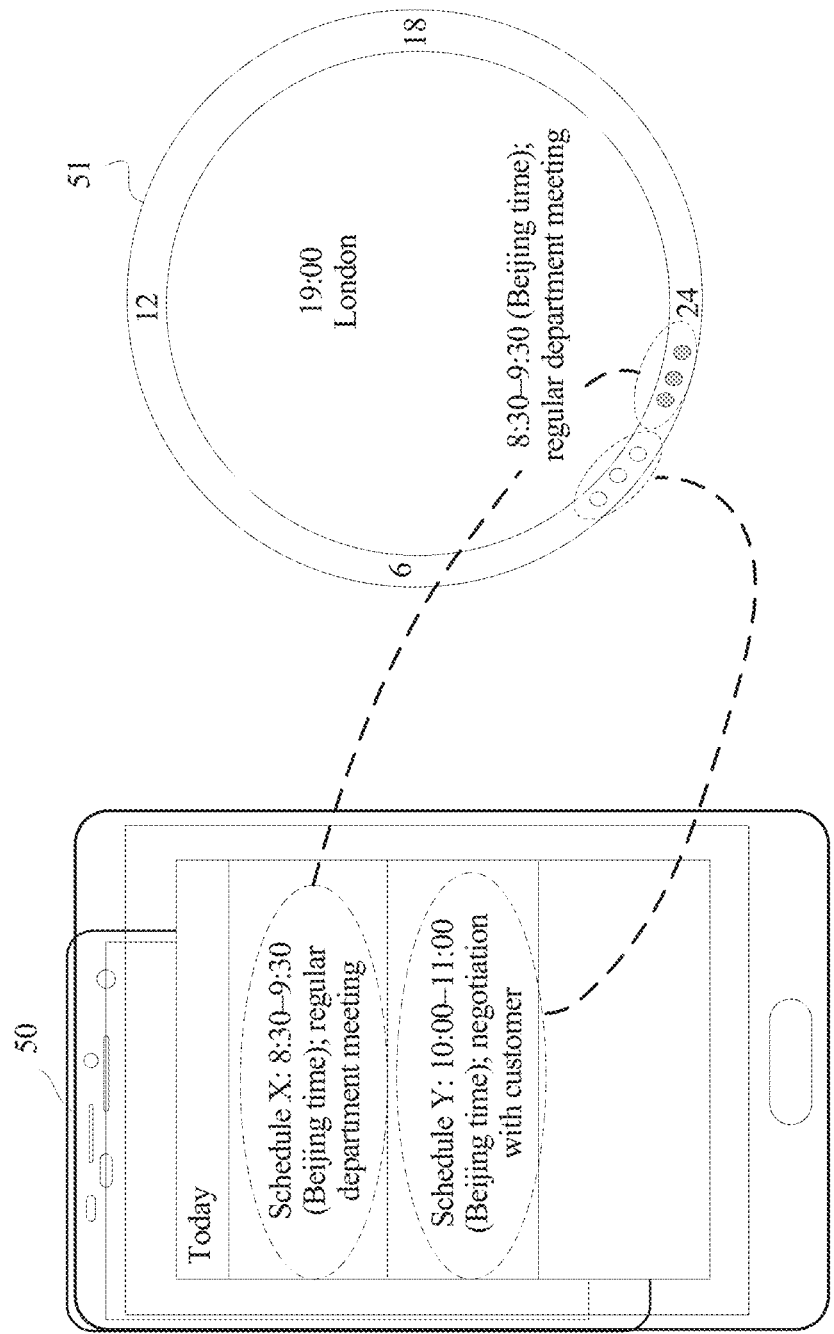

In some possible implementations, whether a reference time zone of a schedule corresponding to a currently displayed identifier is consistent with a current system time zone of the electronic terminal may be determined. If the reference time zone is inconsistent with the current system time zone, a schedule time corresponding to the schedule is converted to a time of the current system time zone. For example, as shown in FIG. 5B, a reference time zone that is set for a schedule in the smartphone 50 is the Beijing time zone. If the current system time zone of the electronic terminal is the London time zone, time information corresponding to the schedule needs to be converted to a time of the current system time zone. For example, time information of the schedule X is Beijing time 8:30-9:30, so that the time information converted to London time is 00:30-1:30. As shown in FIG. 5B, an identifier corresponding to the schedule X is displayed in a display area of 00:30-1:30 on the watch face. Optionally, the converted time may be displayed when the schedule is displayed. For example, time information 00:30-1:30 (London time) may be displayed when information about the schedule X is displayed; or unconverted time information may be displayed when the information about the schedule is displayed, and a reference time zone of the unconverted time information is indicated. As shown in FIG. 5B, the identifier corresponding to the schedule X is displayed on a timescale of 00:30-1:30, and displayed time information of the schedule X is the unconverted time information, namely, 8:30-9:30 (Beijing time).

Figures 1, 5C:
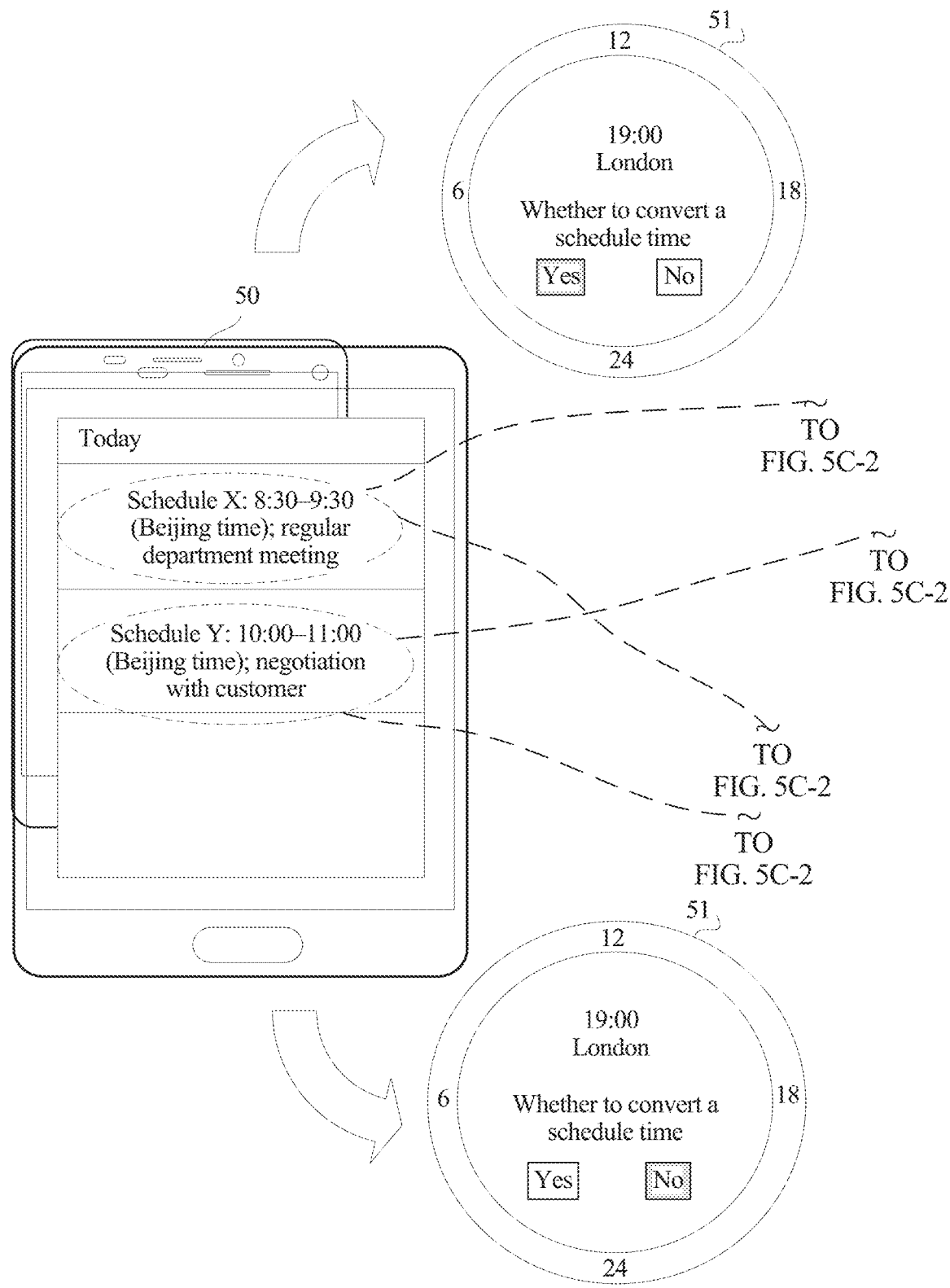
Figures 2, 5C:
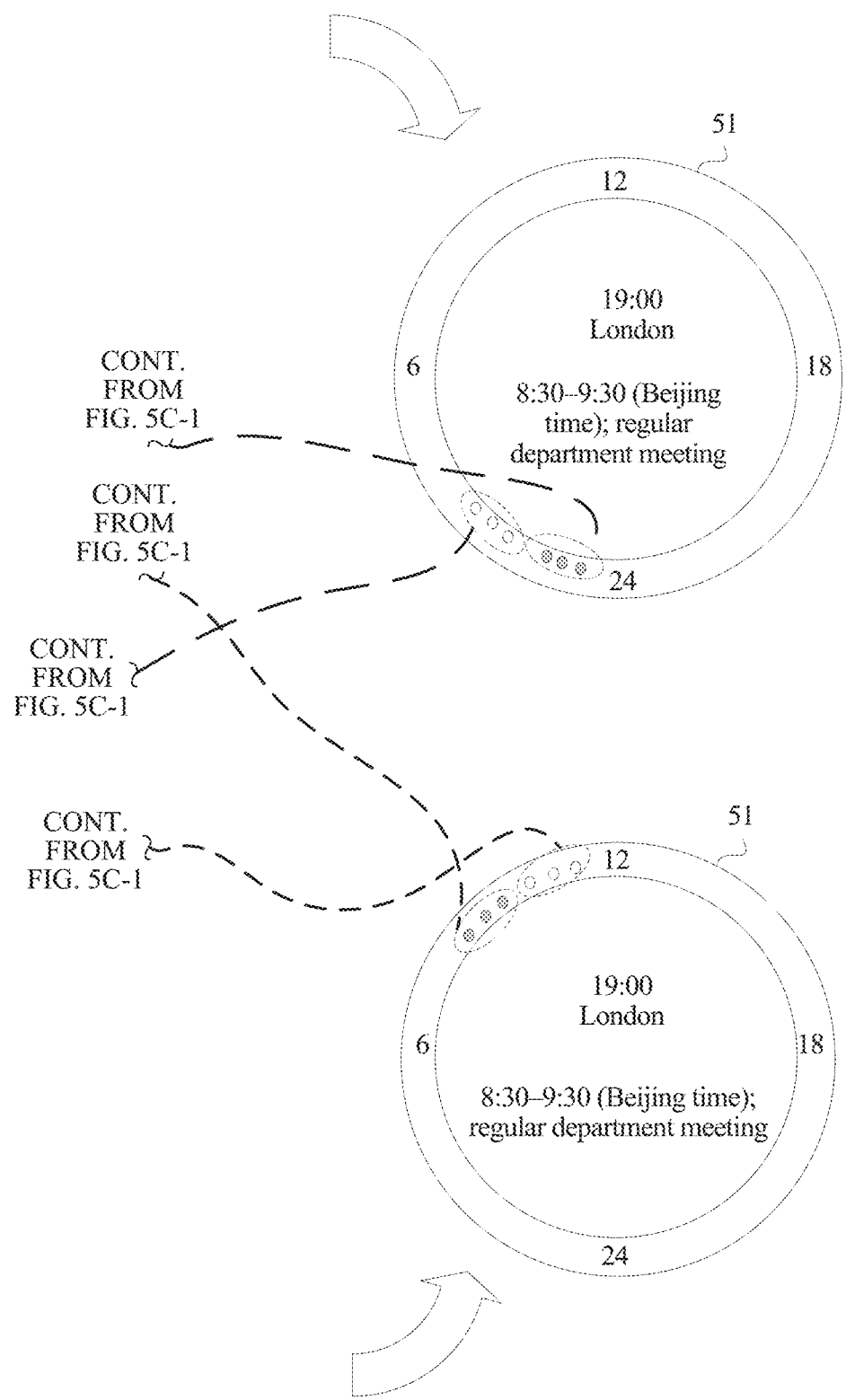

In some possible implementations, when it is determined that the reference time zone of the schedule is inconsistent with the current system time zone of the electronic terminal, a prompt of whether to switch a time zone is further provided for the user by the electronic terminal 51. For an example prompt manner, refer to FIG. 5C-1 and FIG. 5C-2. As shown in FIG. 5C-1 and FIG. 5C-2, prompt information is displayed on the watch face, and a confirmation operation of switching a time zone performed by the user may be received by using a control or another interface element. If it is detected that the user selects "Yes", it indicates that the user operation is a confirmation operation of switching a time zone performed by the user. If it is detected that the user selects "No", it indicates that the user operation is a confirmation operation of not switching a time zone performed by the user. Herein, the obtained time information of the schedule in the obtained reference time zone of the schedule is defined as first time information, and time information that is in the current system time zone and that is converted from the obtained time information of the schedule is defined as second time information. If the confirmation operation of switching a time zone (for example, the user selects "Yes") performed by the user on the obtained schedule is detected, the first time information may be switched to the second time information, and a display location of an identifier corresponding to the obtained schedule is associated with the second time information, for example, the display location of the identifier corresponding to the obtained schedule is on a timescale corresponding to the second time information. If the confirmation operation of not switching a time zone (for example, the user selects "No") performed by the user on the obtained schedule is detected, a display location of an identifier corresponding to the obtained schedule may be directly associated with the first time information, for example, the display location of the identifier corresponding to the obtained schedule is on a timescale corresponding to the first time information.

In some possible implementations, the electronic terminal can further detect a creation operation of a user in addition to obtaining a schedule from another device (for example, a smartphone). The creation operation of the user is used to create a new schedule on the watch face of the electronic terminal. For example, the creation operation of the user includes but is not limited to a voice instruction entered on a language function input interface of the watch face, or a gesture operation for the watch face. When the creation operation of the user is detected, the schedule management application of the electronic terminal may be started to further create a new schedule based on the user operation. An identifier corresponding to the new schedule may be displayed on the watch face. Optionally, an identifier corresponding to an obtained schedule and an identifier corresponding to a created schedule may be distinctively displayed.

In some possible implementations, a manner of creating a schedule in a user interface may further include: in response to a detected creation operation performed by the user in the first display area, after an operation range of the creation operation is obtained, determining, based on the operation range, a timescale corresponding to the creation operation in the first display area. For example, a slide operation performed by the user in the first display area is detected, and a sliding track is corresponding to a timescale 8:00-9:00, so that it may be determined, based on the timescale, that duration from a start time to an end time of the created schedule is 8:00-9:00, and an identifier corresponding to the created schedule is displayed on the timescale of 8:00-9:00 in response to the creation operation. Further, after the creation operation of the user is detected, a prompt may be further provided for the user to enter other information of the schedule except the time information. This implementation enables the user to quickly create a schedule without accessing the schedule management application, reducing interaction layers.

In some possible implementations, the user may further perform a movement operation on an identifier displayed in the user interface. In a specific implementation, in response to a movement operation performed by the user on an identifier in the first display area, a display location of the identifier may be moved. For example, if it is detected that the user drags an identifier currently displayed on a timescale 12:00 to a timescale 15:00, displaying of the identifier on the timescale 12:00 is stopped, and the identifier is displayed on the timescale 15:00. Correspondingly, time information of a schedule corresponding to the identifier may be changed based on a creation operation of the user, to change a start time of the schedule from 12:00 to 15:00. After the time information of the schedule is changed, the changed time information of the schedule may be automatically displayed. Alternatively, in response to a first view operation, a second view operation, or all view operations performed by the user on an identifier displayed at 15:00, changed time information of a schedule corresponding to the identifier on the timescale 15:00 is displayed. This implementation enables the user to edit a time of a schedule without accessing the schedule management application, reducing interaction layers.

In some possible implementations, the user may further perform a movement operation on information about a schedule displayed in the first display area. In a specific implementation, in response to a detected movement operation performed by the user on information that is about a first schedule corresponding to the first identifier and that is displayed in the first display area, a display location of the information about the first schedule is moved, and a second identifier is generated. A moved display location of the information about the first schedule is associated with the second identifier, where a display location of the second identifier is determined based on the movement operation, and time information of the first schedule is changed. For example, in FIG. 1D-1, the first identifier is displayed at 9:00 in the first display area, and the displayed information about the first schedule corresponding to the first identifier is "Conference". A display area of the information about the first schedule is associated with the first identifier. When a movement operation performed by the user on the information about the first schedule is detected, for example, the user moves the information about the first schedule to a location close to a timescale 12:00, the corresponding second identifier is generated at the timescale 12:00, and a moved display location of the information about the first schedule is associated with the second identifier, so that the start time of the first schedule is changed from 9:00 to 12:00. Further, the changed start time of the first schedule may be displayed in the second display area. Alternatively, a changed start time of a first schedule corresponding to the second identifier is displayed in response to a view operation performed by the user on the second identifier. Alternatively, the user moves the information about the first schedule to a location close to the timescale 12:00. If a third identifier is displayed at 12:00, the display location of the information about the first schedule is associated with the third identifier.

The following describes an implementation of an electronic terminal in an embodiment of the present invention. The electronic terminal supports multithreaded running, and can simultaneously run a plurality of applications or services. The applications supported by the electronic terminal may include: a schedule management application such as a calendar, a social application such as Facebook, an image management application such as an album, a map application such as Google Map, a browser such as Safari or Google Chrome, and the like. These applications may have a common input/output device, namely, a touchscreen. The touchscreen is configured to receive a touch operation performed by a user, and display output content of an application. In some possible embodiments, a common input device of the plurality of applications may be a gesture input apparatus such as a gesture sensor.

Figure 6A:
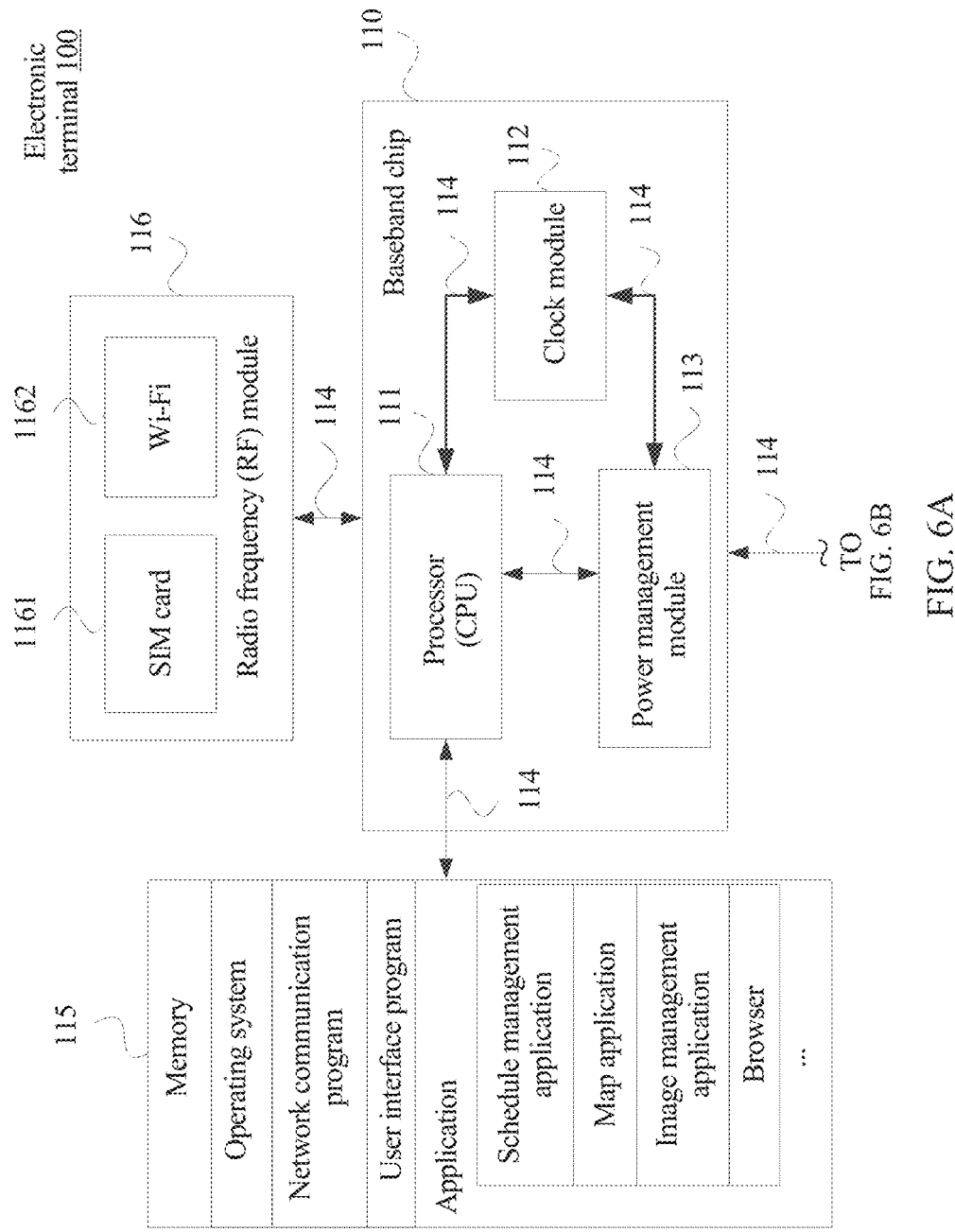
FIG. 6A and FIG. 6B are a schematic structural diagram of an electronic terminal according to an embodiment of the present invention.
Figure 6B:
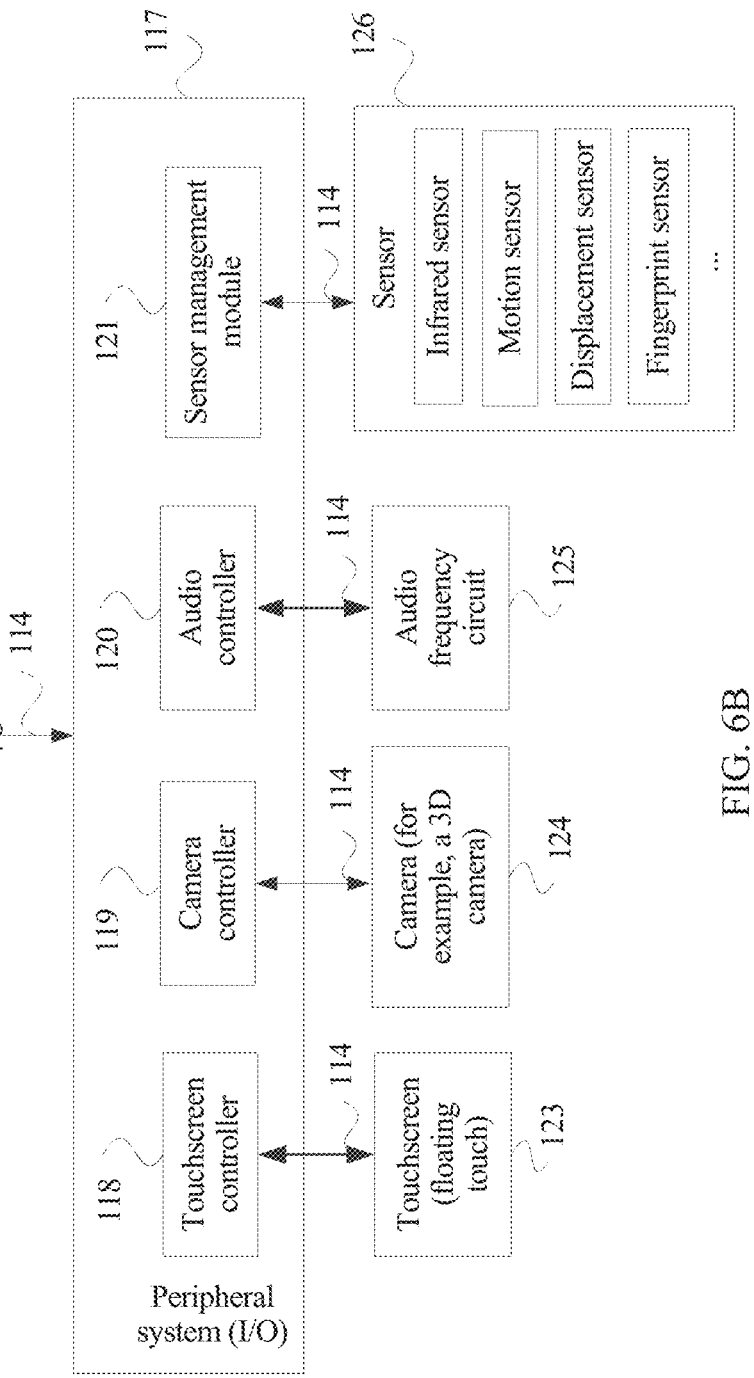

FIG. 6A and FIG. 6B are a structural block diagram of an implementation of an electronic terminal 100. As shown in FIG. 6A and FIG. 6B, the electronic terminal 100 may include a baseband chip 110, a memory 115 including one or more computer-readable storage media, a radio frequency (RF) module 116, and a peripheral system 117. These components may communicate with each other by using one or more communications buses 114.

The peripheral system 117 is mainly configured to implement a function of interaction between the electronic terminal 110 and a user/an external environment, and mainly includes an input/output apparatus of the electronic terminal 100. In a specific implementation, the peripheral system 117 may include a touchscreen controller 118, a camera controller 119, an audio controller 120, and a sensor management module 121. The controllers may be coupled to respective peripheral devices, for example, a touchscreen 123, a camera 124, an audio frequency circuit 125, and a sensor 126. In some embodiments, a gesture sensor in the sensor 126 may be configured to receive a gesture control operation entered by the user. A pressure sensor in the sensor 126 may be disposed below the touchscreen 123 and may be configured to collect touch pressure applied on the touchscreen 123 when the user enters a touch operation by using the touchscreen 123. It should be noted that the peripheral system 117 may further include another I/O peripheral device. In this embodiment of the present invention, the touchscreen 123 may be configured to receive a touch operation and a floating touch operation of the user. Herein, the touch operation is an operation of directly contacting the user's finger (or hand) to a screen, and the floating touch operation is an operation of floating the user's finger (or hand) above a screen without touching the screen. The touchscreen 123 may be further configured to display interface content currently output by the system. The user interface content may include a user interface of a running application, a system level menu, and the like, and may specifically include the following interface elements: input interface elements, such as a button (Button), a text input box (Text), a scroll bar (Scroll Bar), and a menu (Menu); and output interface elements, such as a window (Window) and a label (Label).

The baseband chip 110 may include one or more processors 111, a clock module 112, and a power management module 113 through integration. The clock module 112 integrated into the baseband chip 110 is mainly configured to generate a clock required for data transmission and time sequence control for the processor 111. The power management module 113 integrated into the baseband chip 110 is mainly configured to provide stable and high-precision voltage for the processor 111, the radio frequency module 116, and the peripheral system.

The radio frequency (RF) module 116 is configured to receive and send a radio frequency signal, and mainly integrates a receiver and a transmitter of the electronic terminal 100. The radio frequency (RF) module 116 communicates with a communications network and another communications device by using the radio frequency signal. In a specific implementation, the radio frequency (RF) module 116 may include but is not limited to an antenna system, an RF transceiver, one or more amplifiers, a tuner, one or more oscillators, a digital signal processor, a CODEC chip, a SIM card, and a storage medium. In some embodiments, the radio frequency (RF) module 116 may be implemented on a separate chip.

The memory 115 is coupled to the processor 111 and is configured to store various software programs and/or a plurality of groups of instructions. During specific implementation, the memory 115 may include a high-speed random access memory, and may also include a non-volatile memory, such as one or more disk storage devices, a flash memory device, or another non-volatile solid-state storage device. The memory 115 may store an operating system, for example, an embedded operating system such as Android, iOS, Windows, or Linux. The memory 115 may further store a network communication program. The network communication program may be used to communicate with one or more auxiliary devices, one or more terminal devices, and one or more network devices. The memory 115 may further store a user interface program. The user interface program may vividly display content of an application by using a graphical operation interface, and receive, by using an input control such as a menu, a dialog box, or a button, a control operation performed on the application by the user.

The memory 115 may further store one or more programs. As shown in FIG. 6A and FIG. 6B, the programs may include: a schedule management application such as a calendar, a social application such as Facebook, an image management application such as an album, a map application such as Google Map, a browser such as Safari or Google Chrome, and the like.

It should be understood that the electronic terminal 100 is merely an example provided in this embodiment of the present invention. In addition, the electronic terminal 100 may include more or fewer components than shown components, or may combine two or more components, or may have different component configurations.

Based on the foregoing embodiment and the electronic terminal 110 described in the embodiment in FIG. 6A and FIG. 6B, the following describes a schedule processing method provided in an embodiment of the present invention.

Figure 7:
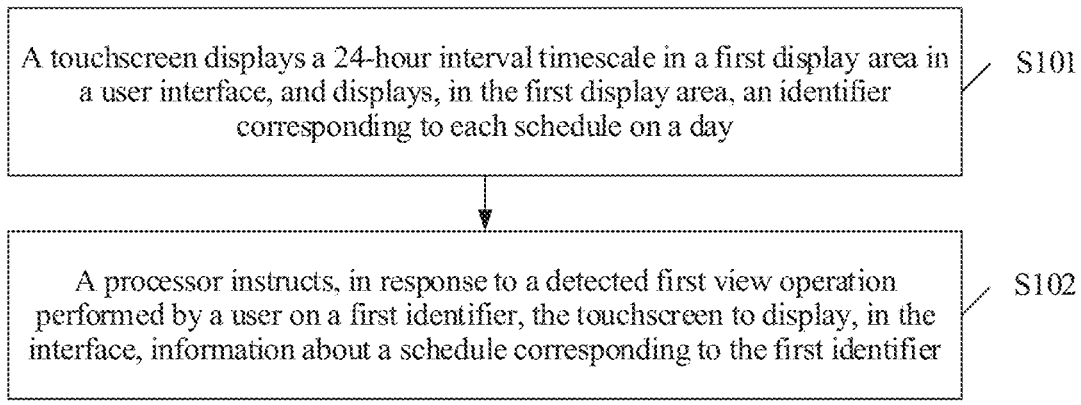
FIG. 7 is a schematic flowchart of a schedule processing method according to an embodiment of the present invention.

Referring to FIG. 7. FIG. 7 is a schematic flowchart of a schedule processing method according to an embodiment of the present invention. As shown in FIG. 7, the method includes the following steps:

Step S101: A touchscreen displays a 24-hour interval timescale in a first display area in a user interface, and displays, in the first display area, an identifier corresponding to each schedule on a day, where a display location of the identifier corresponding to each schedule is associated with time information of each schedule, and the user interface includes the first display area and a second display area.

Step S102: A processor instructs, in response to a detected first view operation performed by a user on a first identifier, the touchscreen to display, in the user interface, information about a schedule corresponding to the first identifier.

By implementing this embodiment of the present invention, the 24-hour interval timescale is displayed in the first display area in the user interface, and the identifier corresponding to each schedule on the day is displayed in the first display area, where the display location of the identifier corresponding to each schedule is associated with the time information of each schedule, and the user interface includes the first display area and the second display area. In this way, the user can intuitively obtain a quantity of schedules on the day and times of the schedules. In response to the detected first view operation performed by the user on the first identifier, the information about the schedule corresponding to the first identifier is displayed in the user interface. Therefore, the user can directly view information about a schedule in the user interface without switching a user interface or accessing a specific application, reducing interaction layers, simplifying a user operation, and increasing intelligence of human-computer interaction.

Figure 8:
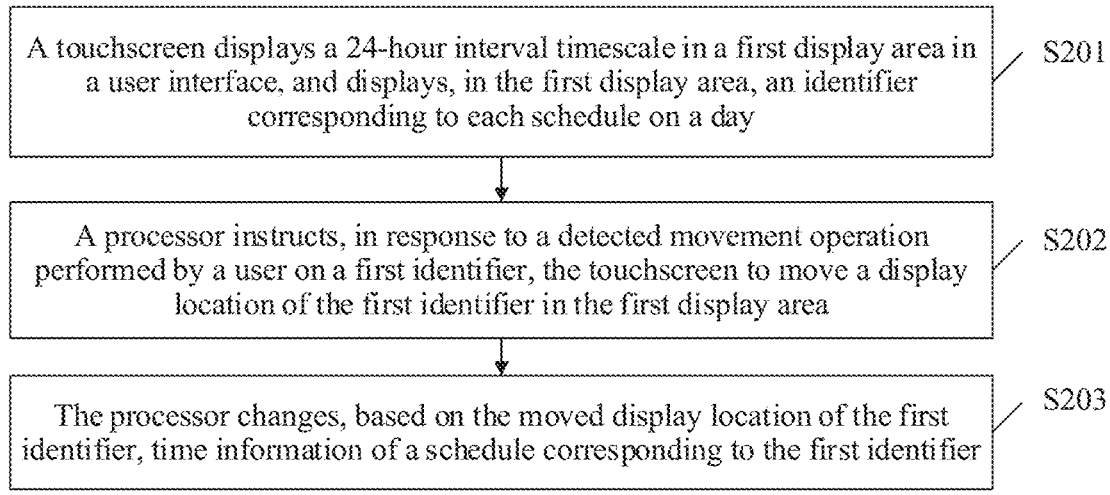
FIG. 8 is a schematic flowchart of another schedule processing method according to an embodiment of the present invention.

Referring to FIG. 8, FIG. 8 is a schematic flowchart of another schedule processing method according to an embodiment of the present invention. As shown in FIG. 8, the method includes the following steps:

Step S201: A touchscreen displays a 24-hour interval timescale in a first display area in a user interface, and displays, in the first display area, an identifier corresponding to each schedule on a day, where a display location of the identifier corresponding to each schedule is associated with time information of each schedule, and the user interface includes the first display area and a second display area.

Step S202: A processor instructs, in response to a detected movement operation performed by a user on a first identifier, the touchscreen to move the display location of the first identifier in the first display area.

Step S203: The processor changes, based on the moved display location of the first identifier, the time information of the schedule corresponding to the first identifier.

In some possible implementations, the method further includes: instructing, by the processor, the touchscreen to display, in the user interface, the changed time information of the schedule corresponding to the first identifier.

In some possible implementations, the method further includes: in response to the detected first view operation performed by the user on the first identifier, displaying, in the user interface, the changed time information of the schedule corresponding to the first identifier.

By implementing this method embodiment, the user can perform a movement operation on an identifier displayed in the user interface, and can conveniently move the identifier to any moment in a whole day based on the displayed 24-hour interval timescale, and can edit a time of the schedule in the user interface, so that the user can edit time information of the schedule without accessing another application, reducing interaction layers.

It should be noted that some or all methods described in the foregoing embodiments may further be implemented in FIG. 7 and FIG. 8.

An embodiment of the present invention further provides a readable non-volatile storage medium for storing a computer instruction, where the computer instruction is executed by an electronic terminal having a touchscreen, to implement some or all methods described in the foregoing method embodiments.

Figure 9:
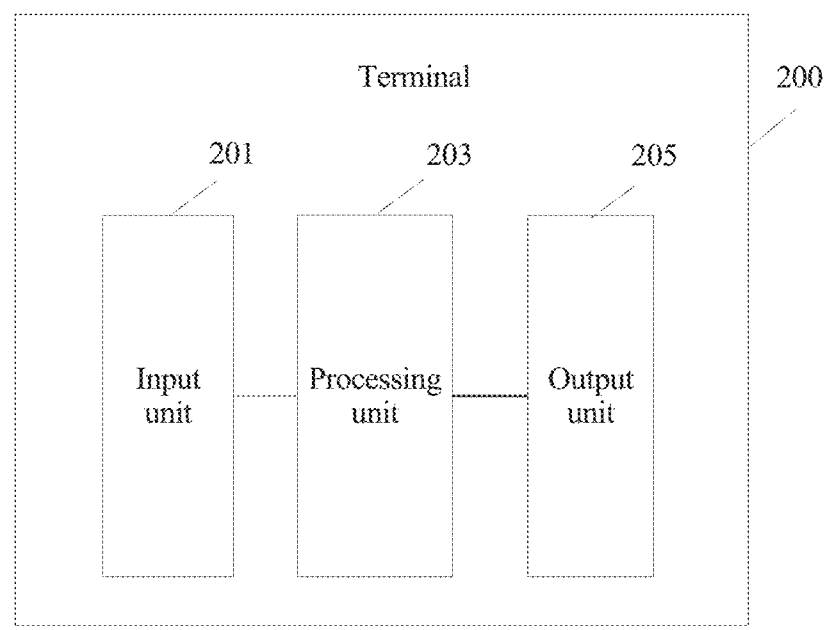
FIG. 9 is a functional block diagram of an electronic terminal according to an embodiment of the present invention.

FIG. 9 is a functional block diagram of an electronic terminal according to an embodiment of the present invention. A functional block of the electronic terminal may be in a form of hardware, software, or a combination of hardware and software, to implement the solutions of the present invention. A person skilled in the art should understand that the functional blocks described in FIG. 9 may be combined by or separated into several subblocks to implement the solutions in the embodiments of the present invention. Therefore, the foregoing content described in the present invention may support any possible combination, separation or further definition of the following functional modules. As shown in FIG. 9, an electronic terminal 200 may include an input unit 201, a processing unit 203, and an output unit 205.

The output unit 205 is configured to display a 24-hour interval timescale in a first display area in a user interface, and display, in the first display area, an identifier corresponding to each schedule on a day, where a display location of the identifier corresponding to each schedule is associated with time information of each schedule, and the user interface includes the first display area and a second display area.

The processing unit 203 is configured to: in response to a first view operation that is performed by a user on a first identifier and that is detected by the input unit 201, display, in the user interface, information about a schedule corresponding to the first identifier.

Specifically, the input unit 201 may be the touchscreen 123 in FIG. 6A and FIG. 6B, or may be a gesture sensor or another input apparatus, for example, a voice input apparatus. Correspondingly, the first view operation may be a touch operation detected by the touchscreen 123, or may be a gesture operation detected by the gesture sensor, or may be a user operation of another type.

It should be noted that the foregoing functional unit may further perform some or all methods described in the foregoing method embodiments. For a hardware structure on which the foregoing functional unit is based, refer to the embodiment shown in FIG. 6A and FIG. 6B. Details are not described herein again.

A person skilled in the art should understand that the embodiments of the present invention may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, an optical memory, and the like) that include computer-usable program code.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Obviously, a person skilled in the art can make various modifications and variations to the present invention without departing from the spirit and scope of the present invention. The present invention is intended to cover these modifications and variations provided that they fall within the scope of protection defined by the following claims and their equivalent technologies.

What is claimed is:

1. A schedule processing method implemented by an electronic terminal, the method comprising:
    displaying a 24-hour interval timescale in a first display area in a user interface, wherein the user interface comprises the first display area and a second display area;
    displaying a plurality of identifiers corresponding to a plurality of different events scheduled on a day in the first display area, wherein a display location of each of the identifiers is associated with time information of a respective event;
    detecting a view operation within a coordinate range of the first display area;
    determining that the coordinate range of the first display area covers at least two identifiers of the plurality of identifiers, wherein the at least two identifiers correspond to two different events scheduled during the day; and
    simultaneously displaying, in the second display area, content information corresponding to the at least two identifiers in response to detecting the view operation and determining that the coordinate range of the first display area covers the at least two identifiers.

2. The schedule processing method of claim 1, wherein the 24-hour interval timescale comprises a daytime period and a nighttime period, and wherein the schedule processing method further comprises separately displaying the daytime period and the nighttime period in the second display area.

3. The schedule processing method of claim 1, wherein, before simultaneously displaying the content information corresponding to the at least two different events in the second display area, the schedule processing method further comprises displaying the content information corresponding to the at least two different events in the first display area, and wherein a display location of the content information corresponding to the at least two different events is associated with a display location of the at least two identifiers.

4. The schedule processing method of claim 1, wherein the at least two different events have start times that are closest to a current system time.

5. The schedule processing method of claim 1, wherein simultaneously displaying the content information corresponding to the at least two different events in the second display area further comprises alternately displaying the content information corresponding to the at least two different events in the second display area.

6. The schedule processing method of claim 1, further comprising:
    detecting a second view operation on a third identifier of the plurality of identifiers; and
    displaying content information about a event corresponding to the third identifier in the second display area in response to detecting the second view operation by replacing the content information corresponding to the at least two different events in the second display area.

7. The schedule processing method of claim 6, wherein the content information corresponding to the third identifier is different than the content information corresponding to the at least two different events.

8. The schedule processing method of claim 1, further comprising:
    detecting a third view operation; and
    displaying content information about the plurality of different events corresponding to all of the plurality of identifiers in the user interface in response to detecting the third view operation.

9. An electronic terminal, comprising:
    a touchscreen configured to:
        display a 24-hour interval timescale in a first display area in a user interface, wherein the user interface comprises the first display area and a second display area; and
        display a plurality of corresponding to a plurality of different events scheduled on a day in the first display area, wherein a display location of each of the identifiers is associated with time information of a respective event; and
    a processor coupled to the touchscreen and configured to:
        detect a view operation within a coordinate range of the first display area;
        determine that the coordinate range of the first display area covers at least two identifiers of the plurality of identifiers, wherein the at least two identifiers correspond to two different events scheduled during the day; and
        instruct the touchscreen to simultaneously display, in the second display area, content information corresponding to the at least two identifiers in response to the view operation.

10. The electronic terminal of claim 9, wherein the 24-hour interval timescale comprises a daytime period and a nighttime period, and wherein the electronic terminal is further configured to separately display a display area of the daytime period and a display area of the nighttime period in the second display area.

11. The electronic terminal of claim 10, wherein the at least two different events have start times that are closest to a current system time.

12. The electronic terminal of claim 10, wherein the processor is further configured to:
   detect a second view operation on a third identifier of the plurality of identifiers; and
   instruct the touchscreen to display content information about an event corresponding to the third identifier in the second display area in response to the second view operation by replacing the content information corresponding to the at least two different events in the second display area.

13. The electronic terminal of claim 12, wherein the content information corresponding to the third identifier is different than the content information about the at least two different events.

14. The electronic terminal of claim 9, wherein, before the content information corresponding to the at least two different events is simultaneously in the second display area, the processor is configured to instruct the touchscreen to display the content information corresponding to the at least two different events in the first display area, and wherein a display location of the content information is associated with a display location of the at least two identifiers.

15. The electronic terminal of claim 9, wherein the processor is further configured to instruct the touchscreen to alternately display the content information corresponding to the at least two different events in the second display area.

16. The electronic terminal of claim 9, wherein the processor is further configured to:
   detect a third view operation; and
   instruct the touchscreen to alternately display content information about the plurality of different events corresponding to all of the plurality of identifiers in the user interface in response to the third view operation on all of the one or more identifiers in the first display area.

17. A non-transitory computer readable storage medium storing instructions that, when executed by a processor, cause an electronic terminal including a touchscreen to be configured to:
   display a 24-hour interval timescale in a first display area in a user interface, wherein the user interface comprises the first display area and a second display area;
   display a plurality of identifiers corresponding to a plurality of different events scheduled on a day in the first display area, wherein a display location of each of the identifiers is associated with time information of a respective event;
   detect a view operation within a coordinate range of the first display area;
   determine that the coordinate range of the first display area covers at least two identifiers of the plurality identifiers, wherein the at least two identifiers correspond to two different events scheduled during the day; and
   simultaneously display, in the second display area, content information corresponding to the at least two identifiers in response to the first view operation.

18. The non-transitory computer readable storage medium of claim 17, wherein the 24-hour interval timescale comprises a daytime period and a nighttime period, and wherein the instructions cause the electronic terminal to separately display a display area corresponding to the daytime period and a display area corresponding to the nighttime period in the second display area.

19. The non-transitory computer readable storage medium of claim 17, wherein, before the content information corresponding to the at least two different events is simultaneously in the second display area, the instructions cause the electronic terminal to display the content information corresponding to the at least two different events in the first display area, and wherein a display location of the content information corresponding to the at least two different events is associated with a display location of the at least two identifiers.

20. The non-transitory computer readable storage medium of claim 19, wherein the at least two different events have start times that are closest to a current system time.

* * * * *